United States Patent
Dievendorff et al.

(10) Patent No.: US 6,920,636 B1
(45) Date of Patent: Jul. 19, 2005

(54) QUEUED COMPONENT INTERFACE PASSING FOR RESULTS OUTFLOW FROM QUEUED METHOD INVOCATIONS

(75) Inventors: Richard Dievendorff, Bellevue, WA (US); Patrick J. Helland, Bellevue, WA (US); Gagan Chopra, Redmond, WA (US); Mohsen Al-Ghosein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/464,636

(22) Filed: Dec. 15, 1999

(51) Int. Cl.[7] .................................................. G06F 9/44
(52) U.S. Cl. ...................................... 719/315; 719/316
(58) Field of Search ................................. 719/313–315, 719/317, 316, 330; 709/201, 202, 315, 330

(56) References Cited

U.S. PATENT DOCUMENTS

| | | |
|---|---|---|
| 4,635,208 A | 1/1987 | Coleby et al. |
| 5,212,793 A | 5/1993 | Donica et al. |
| 5,511,197 A | 4/1996 | Hill et al. |
| 5,519,863 A | 5/1996 | Allen et al. |
| 5,581,686 A | 12/1996 | Koppolu et al. |
| 5,581,760 A | 12/1996 | Atkinson et al. |
| 5,687,370 A | 11/1997 | Garst et al. |
| 5,764,897 A | 6/1998 | Khalidi |
| 5,794,038 A | 8/1998 | Stutz et al. |
| 5,802,291 A | 9/1998 | Balick et al. |
| 5,826,270 A | * 10/1998 | Rutkowski et al. ............ 707/10 |
| 5,848,234 A | * 12/1998 | Chernick et al. ........... 709/203 |
| 5,872,976 A | 2/1999 | Yee et al. |
| 5,889,957 A | 3/1999 | Ratner et al. |
| 5,933,593 A | 8/1999 | Arun et al. |
| 5,958,004 A | 9/1999 | Helland et al. |

(Continued)

FOREIGN PATENT DOCUMENTS

| | | |
|---|---|---|
| EP | 0 414 624 A | 2/1991 |
| EP | 0 674 260 A | 9/1995 |
| EP | 0 738 966 A | 10/1996 |
| EP | 0 777 178 A | 6/1997 |
| WO | 98 02809 | 1/1998 |
| WO | WO 98 02809 A | 1/1998 |

OTHER PUBLICATIONS

R. Limprecht, "Microsoft Transaction Server", IEEE, pp. 14–18 (Feb. 1997).

G. Eddon, "COM+: The Evolution of Component Services", IEEE on Computer, pp. 104–106 (Jul. 1999).

(No author given) "Transaction Context Objects in Microsoft TRansaction Server", MSDN, pp (2) (Jun. 1997).

(Continued)

*Primary Examiner*—Meng-Al T. An
*Assistant Examiner*—Li Zhen
(74) *Attorney, Agent, or Firm*—Klarquist, Sparkman, Campbell

(57) ABSTRACT

Queued component interface passing provides a way for a queued component to convey results of processing a client program's method invocations made asynchronously via a queue. A queued component recorder for a "processing" queued component operates to marshal-by-value a method invocation parameter that is reference to another queued component recorder for another "results" queued component into a data stream of recorded method invocations, which is then submitted as a message to a queue associated with the processing queued component. On receipt of the message from the queue, a queued component player for the processing queued component unmarshals the reference to the other queued component recorder and passes this reference to the processing queued component. The processing queued component uses the passed reference to invoke methods of the results queued component through its message queue, which conveys the processing queued component's results.

14 Claims, 6 Drawing Sheets

U.S. PATENT DOCUMENTS

| | | | |
|---|---|---|---|
| 5,991,536 A | | 11/1999 | Brodsky et al. |
| 6,026,428 A | | 2/2000 | Hutchison et al. |
| 6,105,147 A | | 8/2000 | Molloy |
| 6,125,400 A | * | 9/2000 | Cohen et al. ............... 709/330 |
| 6,173,327 B1 | | 1/2001 | DeBorst et al. |
| 6,182,119 B1 | | 1/2001 | Chu |
| 6,253,252 B1 | * | 6/2001 | Schofield ..................... 719/315 |
| 6,253,256 B1 | * | 6/2001 | Wollrath et al. ............ 709/330 |
| 6,393,458 B1 | | 5/2002 | Gigliotti et al. |
| 6,425,017 B1 | * | 7/2002 | Dievendorff et al. ....... 709/315 |
| 6,477,585 B1 | | 11/2002 | Cohen et al. |
| 6,567,861 B1 | * | 5/2003 | Kasichainula et al. ...... 719/330 |
| 6,651,109 B1 | * | 11/2003 | Beck et al. .................. 719/315 |

OTHER PUBLICATIONS

D. Chappell, "The Microsoft Transaction Server (MTS)—Transactions Meet Components", white paper, Microsoft.com (Jun. 1997).

"Implementing Locale As Dynamically Loaded Shared Object Files", ibm Technical Disclosure Bulletin, US, IBM Corp., New York, vol. 34, No. 12, pps. 117–118 XP000308454 ISSN: 0018–8689—the whole document.

Tripathi, A.R. et al.: Design Of A Remote Procedure Call System For Object–Oriented Distributed Programming, Software Practice & Experience, GB, John Wiley & Sons Ltd., Chichester, vol. 28, No. 1, pp. 23–47 XP000723715, ISSN: 0038–0644—the whole document.

Orfali et al., "RPC, Messaging, and Peer–to–Peer," *Essential Client/Server Survival Guide* chapter 9, pp. 119–128 (1994).

White Paper, "Java Remote Method Invocation–Distribution Computing For Java," java.sun.com (Jun. 24, 1998).

Chappell, "Microsoft Message Queue is a Fast, Efficient Choice for Your Distributed Application," *MSJ* 13:17–24 (Jul. 1998).

Bukovec and Dievendorff, "Use MSMQ and MTS to Simplify the Building of Transactional Applications," *MSJ* 13:27–40 (Jul. 1998).

"Java Remote Method Invocation," Sun Microsystems, Inc., chapters 1–10 (Dec. 1997).

"Microsoft® Message Queue Server Guide," *MSDN Library—Jul. 1998*, pp. 1–72 (1998).

"MSMQ Reference," *MSDN Library—Jul. 1998*, pp. 1–87 (1998).

Tripathi et al., "Design of a remote procedure call system for object–oriented distributed programming," *Software Practice & Experience*, GB, John Wiley & Sons, Ltd., Chichester, vol. 28, No. 1, pp. 23–47 (1998).

"Remote Method Invocation Specification," java.sun.com/products/jdk/1.1/docs/guide/rmi/spec/rmiTOC.doc.html, pp. 1–2, 1997.

"Introduction" java.sun.com/products/jdk/1.1/docs/guide/rmi/spec/rmi–intro.doc.html, pp. 1–2, 1997.

"Java Distributed Object Model," http://java.sun.com/products/jdk/1.1/docs/guide/rmi/spec/rmi–objmodel.doc.html, pp. 1–7, 1997.

"System Architecture," java.sun.com/products/jdk/1.1/docs/guide/rmi/spec/rmi–arch.doc.html, pp. 1–12, 1997.

"Client Interfaces," java.sun.com/products/jdk/1.1/docs/guide/rmi/spec/rmi–client.doc.html, pp. 1–3, 1997.

"Server Interfaces," java.sun.com/products/jdk/1.1/docs/guide/rmi/spec/rmi–server.doc.html, pp. 1–10, 1997.

"Registry Interfaces," java.sun.com/products/jdk/1.1/docs/guide/rmi/spec/rmi–registry.doc.html, pp. 1–3, 1997.

"Stub/Skeleton Interfaces," java.sun.com/products/jdk/1.1/docs/guide/rmi/spec/rmi–stubs.doc.html, pp. 1–4, 1997.

"Garbage Collector Interfaces," java.sun.com/products/jdk/1.1/docs/guide/rmi/spec/rmi–dgc.doc.html, pp. 1–5, 1997.

"RMI Wire Protocol," java.sun.com/products/jdk/1.1/docs/guide/rmi/spec/rmi–protocol.doc.html, pp. 1–9, 1997.

"Exceptions in RMI," java.sun.com/products/jdk/1.1/docs/guide/rmi/spec/rmi–exceptions.doc.html, pp. 1–3, 1997.

"Properties in RMI," ://java.sun.com/products/jdk/1.1/docs/guide/rmi/spec/rmi–properties.doc.html, p. 1, 1997.

Barkley, "Application Engineering in Health Care," pp. 1–7, May 9, 1995.

Orfali et al., "Client/Server Transaction Processing," *Client/Server Survival Guide*, pp. 241–288, 1994.

Brockschmidt, "Custom Components and the Component Object Model," *Inside OLE*, $2^{nd}$ Edition, pp. 219–276, 1995.

Brockschmidt, "In–Place Activation (Visual Editing™) and In–Place Containers," *Inside OLE*, $2^{nd}$ Edition, pp. 1011–1063, 1995.

Nierstrasz, "Active Objects in Hybrid," *Proceedings of OOPLSA '87*, pp. 243–253, Oct. 4–8, 1987.

Kiczales, *Aspect–Oriented–Programming*, http://www.parc.xerox.com/spl/projects/aop/invited–talk, 86 pp. 1997.

Aksit et al., "Solving the Modeling Problems of Object–Oriented Languages by Composing Multiple Aspects Using Composition Filters," *Procee dings of the Aspect–Oriented Programming Workshop at ECOOP '98*, 7 pp., 1998.

Bardou, "Roles, Subjects and Aspects: How Do They Relate?," *Proceedings of the Aspect–Oriented Programming Workshop at ECOOP '98*, 7 pp., 1998.

Becker, "$D^2AL$," *Proceedings of the Aspect–Oriented Programming Workshop at ECOOP '98*, 7 pp., 1998.

Berger et al., "Interactions Between Objects: An Aspect of Object–Oriented Languages," *Proceedings of the Aspect–Oriented Programming Workshop at ECOOP '98*, 6 pp., 1998.

Blair et al., "The Impact of Aspect–Oriented Programming on Forman Methods," *Proceedings of the Aspect–Oriented Programming Workshop at ECCOP '98*, 6 pp., 1998.

Blank et al., "Aspects of Enterprise Java Beans," *Proceedings of the Aspect–Oriented Programming Workshop at ECOOP '98*, 4 pp., 1998.

Böllert, "Aspect–Oriented Programming Case Study: System Management Application," *Proceedings of the Aspect–Oriented Programming Workshop at ECOOP '98*, 4 pp., 1998.

Buhr, "A Possible Design Notation for Aspect Oriented Programming," *Proceedings of the Aspect–Oriented Programming Workshop at ECOOP '98*, 11 pp., 1998.

Fabry, "Replication as an Aspect," *Proceedings of the Aspect–Oriented Programming Workshop at ECOOP '98*, 6 pp., 1998.

Fradet et al., "AOP: Towards a Generic Framework Using Program Transformation and Analysis," *Proceedings of the Aspect–Oriented Programming Workshop at ECOOP '98*, 6 pp., 1998.

Hauck et al., "*AspectIX*: A Middleware for Aspect–Oriented Programming," *Proceedings of the Aspect–Oriented Programming Workshop at ECOOP '98*, 5 pp., 1998.

Holmes et al., "Towards Reusable Synchronisation for Object–Oriented Languages," *Proceedings of the Aspect–Oriented Programming Workshop at ECOOP '98*, 10 pp., 1998.

Kendall, "Agent Roles and Aspects," *Proceedings of the Aspect–Oriented Programming Workshop at ECOOP '98*, 7 pp., 1998.

Lopes et al., "Recent Developments in AspectJ™," *Proceedings of the Aspect–Oriented Programming Workshop at ECOOP '98*, 4 pp., 1998.

Lorenz et al., "Vistor Beans: An Aspect–Oriented Pattern," *Proceedings of the Aspect–Oriented Programming Workshop at ECOOP '98*, 8 pp., 1998.

Lunau, "Is Composition of Metaobjects=Aspects Oriented Programming," *Proceedings of the Aspect–Oriented Programming Workshop at ECOOP '98*, 4 pp., 1998.

Kenens et al., "An AOP Case with Static and Dynamic Aspects," *Proceedings of the Aspect–Oriented Programming Workshop at ECOOP '98*, 6 pp., 1998.

Nebbe, "Coordination and Composition: *The Two Paradigms Underlying AOP?,*" *Proceedings of the Aspect–Oriented Programming Workshop at ECOOP '98*, 5 pp., 1998.

Ossher et al., "Operation–Level Composition: A Case in (Join) Point," *Proceedings of the Aspect–Oriented Programming Workshop at ECOOP '98*, 4 pp., 1998.

Sánchez et al., "Run–Time Adaptability of Synchronization Policies in Concurrent Object–Oriented Languages," *Proceedings of the Aspect–Oriented Programming Workshop at ECOOP '98*, 10 pp., 1998.

Tekinerdogan et al., "Deriving Design Aspects from Canonical Models," *Proceedings of the Aspect–Oriented Programming Workshop at ECOOP '98*, 7 pp., 1998.

Walker et al., "Assessing Aspect–Oriented Programming and Design: Preliminary Results," *Proceedings of the Aspect–Oriented Programming Workshop at ECOOP '98*, 6 pp., 1998.

Volder, "Aspect–Oriented Logic Meta Programming," *Proceedings of the Aspect–Oriented Programming Workshop at ECOOP '98*, 6 pp., 1998.

Mens et al., "Aspect–Oriented Programming Workshop Report," *Proceedings of the Aspect–Oriented Programming Workshop at ECOOP '97*, 14 pp., 1997.

Aksit, "Issues in Aspect–Oriented Software Development," *Proceedings of the Aspect–Oriented Programming Workshop at ECOOP '97*, 7 pp., 1997.

Czarnecki et al., "Beyond Objects: Generative Programming," *Proceedings of the Aspect–Oriented Programming Workshop at ECOOP '97*, 8 pp., 1997.

De Meuter, "Monads as a Theoretical Foundation for AOP," *Proceedings of the Aspect–Oriented Programming Workshop at ECOOP '97*, 6 pp., 1997.

Dempsey et al., "*Aspects* of System Support for Distributed Computing," *Proceedings of the Aspect–Oriented Programming Workshop at ECOOP '97*, 6 pp., 1997.

Hernández et al., "Coordinating Concurrent Objects: How to Deal with the Coordination Aspect?," *Proceedings of the Aspect–Oriented Programming Workshop at ECOOP '97*, 6 pp., 1997.

Holmes et al., "Aspects of Synchronisation," *Proceedings of the Aspect–Oriented Programming Workshop at ECOOP '97*, 6 pp., 1997.

Lamping, "The Interaction of Components and Aspect," *Proceedings of the Aspects–Oriented Programming Workshop at ECOOP '97*, 1 pp., 1997.

Matthijs et al., "Aspects Should Not Die," *Proceedings of the Aspect–Oriented Programming Workshop at ECOOP '97*, 5 pp., 1997.

Müller, "draft: Apsect–Design in the Building–Block Method," *Proceedings of the Aspect–Oriented Programming Workshop at ECOOP '97*, 3 pp., 1997.

Harrison et al., "The Beginnings of a Graphical Environment for Subject–Oriented Programming," *Proceedings of the Aspect–Oriented Programming Workshop at ECOOP '97*, 2 pp., 1997.

Thorup, "Contextual Class Extensions," *Proceedings of the Aspect–Oriented Programming Workshop at ECOOP '97*, 7 pp., 1997.

VanHilst, "Subcomponent Decomposition as a Form of Aspect Oriented Programming," *Proceedings of the Aspect–Oriented Programming Workshop at ECOOP '97*, 2 pp., 1997.

Van Roy et al., "Using Mobility to Make Transparent Distribution Practical," *Proceedings of the Aspect–Oriented Programming Workshop at ECOOP '97*, 18 pp., 1997.

Werner, "Email Thoughts," *Proceedings of the Aspect–Oriented Programming Workshop at ECOOP '97*, 1 pp., 1997.

* cited by examiner

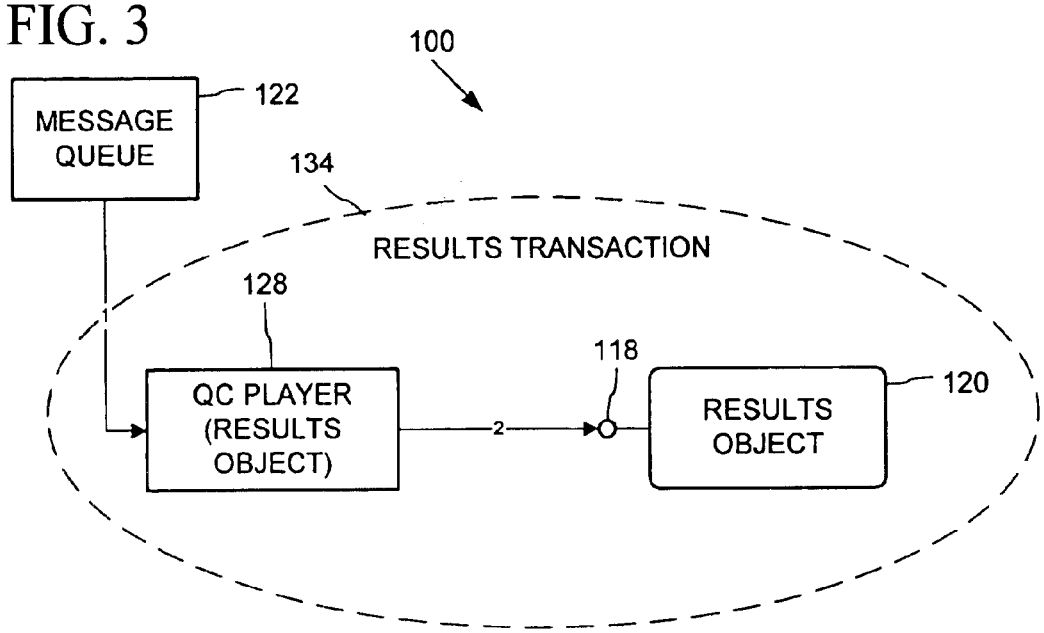
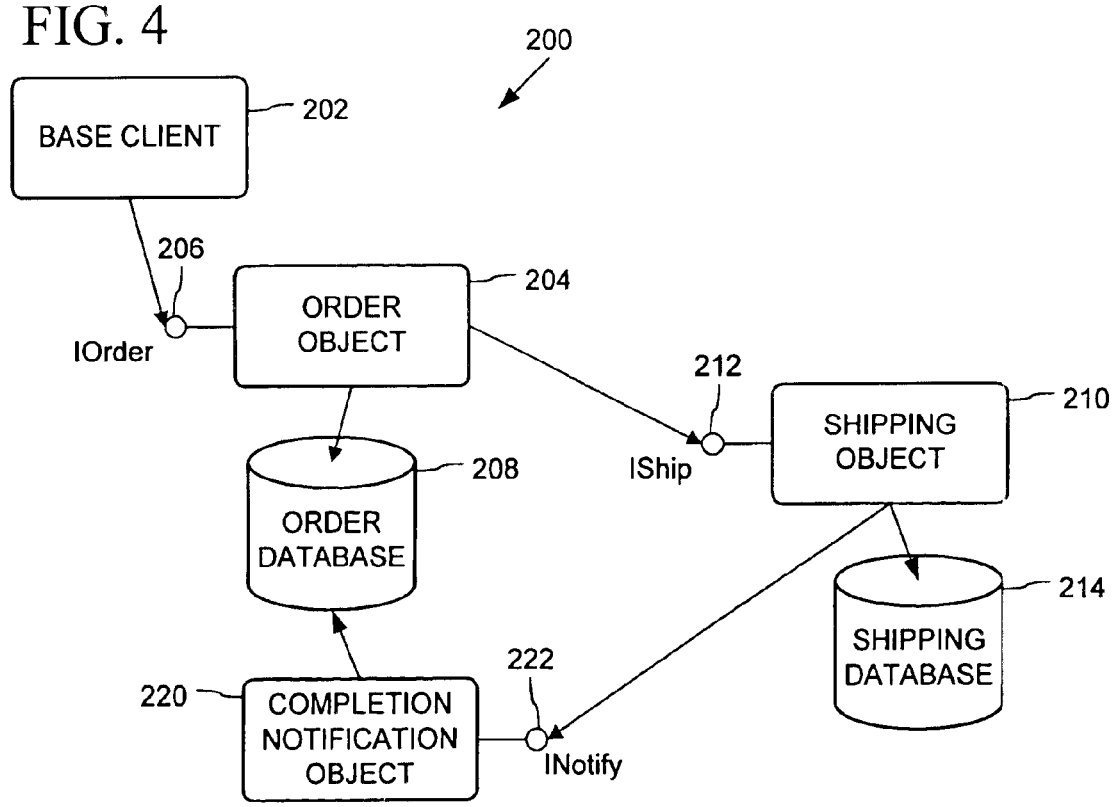

QUEUED COMPONENT INTERFACE PASSING FOR RESULTS OUTFLOW FROM QUEUED METHOD INVOCATIONS

TECHNICAL FIELD

This invention relates to asynchronous or queued interaction of objects in distributed object computing systems.

BACKGROUND OF THE INVENTION

In many information processing applications, a server application running on a host or server computer in a distributed network provides processing services for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations. This is sometimes referred to as client/server computing.

In a form of client/server computing sometimes known as "distributed objects," the server application is developed as a set of components conforming to an object-oriented programming (OOP) model, such as the Microsoft Component Object Model (COM) and Distributed Component Object Model (DCOM), the IBM System Object Model (SOM), the Object Management Group's Common Object Request Broker Architecture (CORBA), and others. Object-oriented programming generally has advantages in ease of programming, extensibility, reuse of code, and integration of software from different vendors and (in some object-oriented programming models) across programming languages.

In object-oriented programming, programs are written as a collection of object classes which each model real world or abstract items by combining data to represent the item's properties with methods (e.g., program functions or procedures) to represent the item's functionality. More specifically, an object is an instance of a programmer-defined type referred to as a class, which exhibits the characteristics of data encapsulation, polymorphism and inheritance.

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related methods of the object. In other words, the client programs do not access the object's data directly, but must instead call methods on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

In distributed object and other client/server computing, it is often desirable and even crucial to coordinate processing activities on multiple computers, by separate processes on one computer, and even within a single process. For example, a money transfer operation in a banking application may involve updates to account information held in separate databases that reside on separate computers. These separate processing activities that form parts of a single logical operation are coordinated so as to take effect as a single indivisible unit of work, commonly referred to as a transaction. In many applications, performing sets of activities as a transaction becomes a business necessity. For example, if only one account is updated in a money transfer operation due to a system failure, the bank in effect creates or loses money for a customer. This coordination of data processing activities in client/server computing is sometimes referred to as on-line transaction processing.

More formally, a transaction is defined to be a collection of actions that conform to a set of properties (referred to as the "ACID" properties) which include atomicity, consistency, isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts and Techniques*, Morgan Kaufmann, 1993.

In client/server computing with "distributed objects," the client program on the user's computer typically uses "real-time" or synchronous processing mechanisms to remotely invoke methods on the server application's objects that reside on the server computer, such as the remote procedure call ("RPC"). In a typical remote procedure call, object services of the operating system compile an interface definition language description of a server application object to generate a local "proxy" for the server application object on the client computer. The client software invokes methods of the remote server application object by issuing ordinary local procedure calls directly to the proxy. The proxy, in turn, utilizes RPC services to convey the procedure call to the actual server application object on the remote server computer. The RPC services marshal values for call parameters into a network message, and send the message via network protocols to the server computer. At the server computer, the RPC services unmarshal the call parameters and issue the call to the proper server application object method. The RPC services also marshal and unmarshal return values from the server application object method back to the client program via a network message.

The RPC services thus handle all the intricacies of network communications effectively "behind the scene," such that the client program invokes the remote method in a similar manner to making a local procedure call. Like a local procedure call, execution of the client program is suspended (also known as "blocking") during the RPC method invocation until the method completes and returns. This results in a synchronous flow of execution among the client program and server application objects.

In a prior patent application (hereafter "the Queued Method Invocations Patent") of Dievendorff et al., entitled "Queued Method Invocations On Distributed Component Applications," U.S. Pat. No. 6,425,017, filed Aug. 17, 1998 (the disclosure of which is incorporated herein by reference), the inventors describe an alternative (termed, "queued components") to real-time or synchronous method invocations (e.g., local and remote procedure calling) that provide a capability for a client of an object to issue and the object to receive method invocations on a queued basis using normal call semantics of an object model and without use of a message queuing API. The object framework or execution environment has services that automatically queue the method invocations, and at a potentially later time issue the queued method invocations to the object. Meanwhile, the client is allowed to continue execution without awaiting completion of the invoked method. Since method invocation queuing is performed transparently to the client and object in the object execution environment services, the client and object which are programmed to use normal call semantics can interact on either a real-time or queued basis, and effectively remain agnostic as to the basis on which the method invocations actually occur in the execution environment. Also, the queuing of the method invocations eliminates any need for the client and object to execute concurrently, which permits queued components to overcome limitations inherent to real-time synchronous method invocation mechanisms as to availability, object lifetimes and reference locality.

The particular implementation of queued components that is illustrated in the Queued Method Invocations Patent imposes a limitation that the client is not able to receive information back from the object via a return value or out parameters of any of the object's methods that is invoked through a queued method invocation. In other words, the queued method invocations are inherently unidirectional exchanges that transfer information only in one direction from the client to the object. The method invocation can have "in" parameters that contain input values for use by the object in executing the requested method. But, the invoked method is not allowed to have out parameters, such as pointers to locations for the object to store results of the method. This is because the client may no longer exist or no longer be available (e.g., where the client's and object's computers are no longer connected) when the queued method invocations are dispatched from the queue to the object.

Additionally, with respect to transaction processing in client/server computing, the implementation of transactional queued method invocations illustrated in the Queued Method Invocations Patent does not transmit the method invocations message to the object's message queue until the client's transaction commits. But, the implementation also ensures that all components that participate in the transaction (including the client) will have all terminated or become stateless before transaction commit completes. At a later time, the queued object is created in and processes the queued method invocations as part of a separate transaction. The client's lifetime thus always ends before the queued object's lifetime begins. Accordingly, due to this separation in the client and queued object's lifetimes, no information resulting from the invoked methods can be passed back from the object to the client.

A problem therefore with queued method invocations and like asynchronous calling mechanisms is how to obtain results of the invoked method without use of out parameters or return values.

A further obstacle for conveying results back to a requesting client application is that the several capabilities of queued components preferably are preserved. This includes that the queued object remains "agnostic" as to whether its methods are invoked through queued or synchronous method invocations. This means the queued object does not require explicit programming to handle queued method invocations, but rather interacts using normal method invocation and return semantics of the object model for both queued and synchronous interaction.

Yet another obstacle is that, in typical use of queued components, the queued object resides on a "server machine" in a distributed computer network and is invoked from possibly many client application programs residing on various client machines of the network. Preferably, the location of the client remains "transparent" to the queued object, meaning the queued object interacts with the client in the same way regardless of its location.

SUMMARY OF THE INVENTION

The present invention provides a capability for an object to convey results from processing queued method invocations, while remaining agnostic as to the queued or synchronous nature of its interaction with its client and retaining location transparency between the object and its client. According to an embodiment of the invention illustrated herein, an interface pointer for a queued object (the "results queued object") can be passed by a client as a parameter of a queued method invocation to another queued object (the "processing queued object"). When such an interface pointer is passed in a queued method invocation, the system in which the objects execute automatically sets up a facility to automatically queue any method invocations issued by the processing queued object with the passed interface pointer into a message queue associated with the results queued object. The processing queued object can then issue method invocations with the passed interface pointer as per normal call semantics of the object model to the results queued object so as to convey the results of processing the client's queued method invocations. Since normal object model call semantics are used to issue the method invocations with the passed interface pointer (i.e., just as if a direct interface pointer to a local object or an interface pointer via an RPC to a remote object were used), the programming of the processing queued object need not differentiate between receiving queued or synchronous method invocations from the client, or even the nature of interaction with the results queued object.

Further, since the system infrastructure automatically establishes method invocation queuing for the processing queued object into the results queued object's associated message queue, the programming of the processing queued object remains independent of the client and results queued object's locations in a distributed computing network. Accordingly, the interface passing of the present invention provides the benefits of permitting the objects to be queued/ synchronous agnostic and location transparent.

According to another aspect of the invention, a method invocation queuing facility that queues method invocations of the client to the processing queued object is augmented to support interface passing of the results queued object's interface. The facility includes a method invocations recorder with support to marshal information sufficient to establish method invocation queuing of the processing queued object's method invocations to the results queued object's interface. The marshaled information can include a name of a message queue associated with the results queued object and a definition of the results queued object's interface. The facility also includes a method invocations player which uses the marshaled information to construct a separate method invocation queuing facility to queue method invocations of the processing queued object to the results queued object.

In object models in which an object pointer or like references are used for method invocations (e.g., instead of or in addition to interface pointers), embodiments of the present invention can support passing of such pointers or references of queued objects in a queued method invocation.

Additional features and advantages of the invention will be made apparent from the following detailed description of an illustrated embodiment which proceeds with reference to the accompanying drawings.

BRIEF DESCRIPTION OF THE DRAWINGS

FIG. 3 is a flow diagram of a results transaction portion of the queued component interface passing use scenario.

FIG. 4 is a block diagram of an example application that can be implemented according to the queued component interface passing use scenario of FIGS. 1–3.

DETAILED DESCRIPTION OF THE INVENTION

In one embodiment of the invention illustrated herein (the "illustrated embodiment"), queued component interface passing in accordance with the present invention is implemented as an enhancement to the queued components architecture disclosed in the above-incorporated prior Queued Method Invocations Patent application. This queued component interface passing also can be implemented in other distributed object systems that provide queuing of method invocations on objects.

Queued Component Interface Passing

Figure 1:
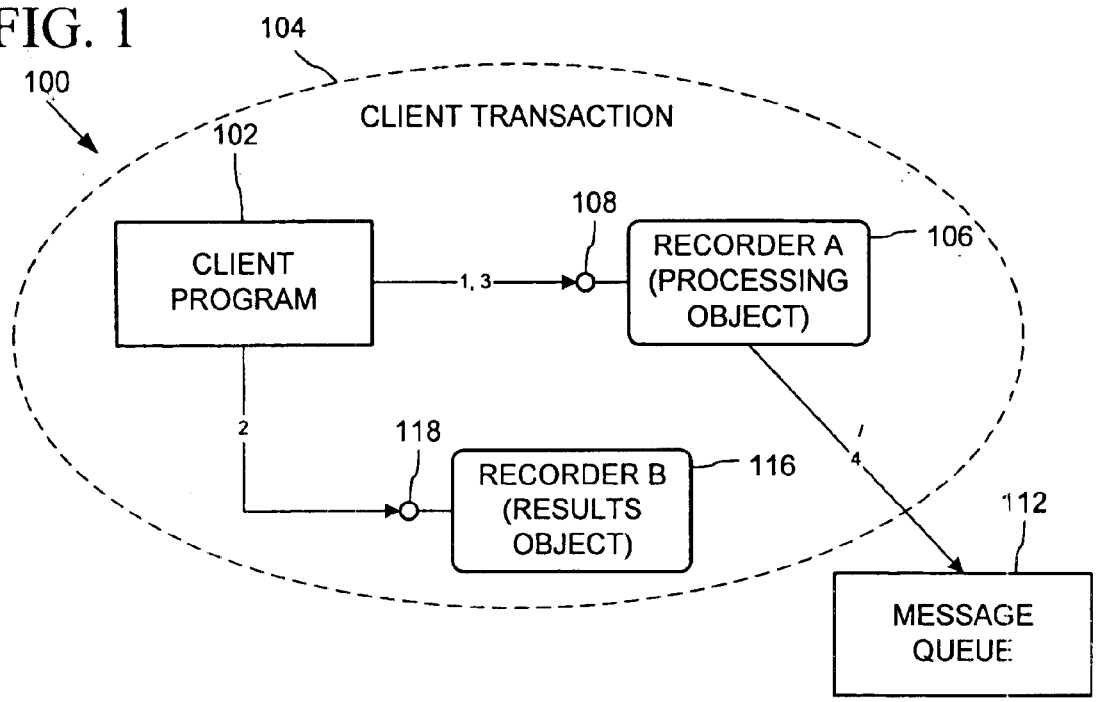
FIG. 1 is a flow diagram of a client transaction portion of a queued component interface passing use scenario.
Figure 2:
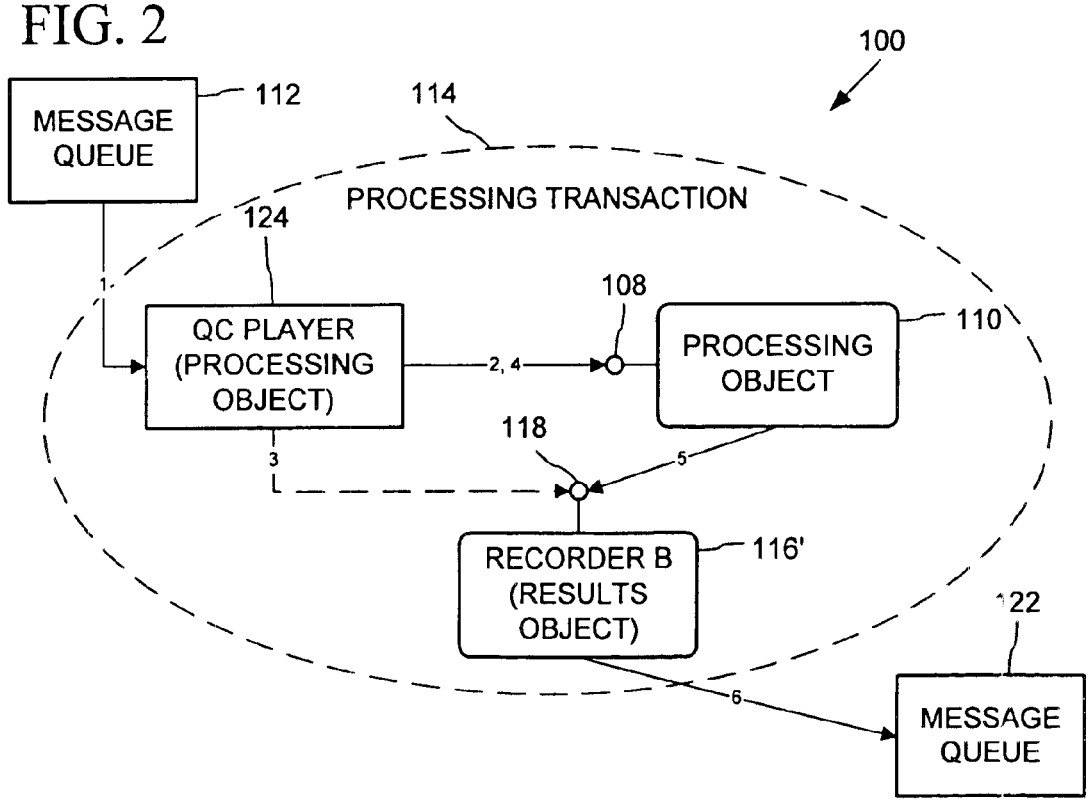
FIG. 2 is a flow diagram of a processing transaction portion of the queued component interface passing use scenario.

With reference now to FIGS. 1–3, queued component interface passing in the illustrated embodiment provides a way for a component-based program to convey results from processing of one or more queued method invocations to another queued component while retaining location and synchronous/queued interaction transparency. In a typical use scenario 100, a client program 102 (FIG. 1) requests processing work by a queued component (the "processing object") 110 (FIG. 2) via a set of queued method invocations sent via a processing object recorder 106 (FIG. 1) and a message queue 112 (FIGS. 1 and 2). In these queued method invocations, the client program 102 passes a reference for a second queued component (the "results object") 120 (FIG. 3), which is to receive the results of the processing work. The QC architecture 330 (FIG. 5) described below detects that such a reference is being passed and automatically persists and moves a results object recorder 116 through which queued method invocations are made to the results object over to the processing object-side (i.e., to the processing object's transaction, process and machine if different from those of the client program) and time of the processing object's activation and invocation (which typically but not necessarily is a separate time from when the client program is run). The client program's queued method invocations are delivered in due course via a message queue 112 to the processing object 110. The processing object 110 performs the processing work required for the client program's queued method invocations. As part of this processing, the processing object 110 uses the passed results object reference to submit queued method invocations to the results object which convey the results of the processing work.

This queued method invocation interface passing overcomes the one-way limitation of queued method invocations. With an interface pointer to a results object recorder that has been moved to the processing object-side and time, the processing object can make queued method invocations which convey results of its processing work back to the client-program designated, results object.

Further, this queued method invocation interface passing also retains location and queued/synchronous transparency. Because the underlying QC Architecture 330 (FIG. 5) described below automatically persists and moves the results object recorder 116 to the processing object-side and time of invocation, the processing object 110 is provided with a local direct interface pointer for the results object recorder, which the processing object uses to invoke methods of the results object 120. Accordingly, the programming of the processing object does not distinguish between whether it has an interface pointer for the results object recorder 116 or directly for the results object 120 itself. The processing object therefore can be used without modification of its programming in either the illustrated use scenario 100 where method invocations between the client program, the processing object and the results object are made on a queued basis; or alternatively in a use scenario where the method invocations are synchronous. The programming of the processing object thus is agnostic as to location (in-process, local or remote) of the client program and results object, and as to the queued or synchronous nature of its interaction with the client program and results object. The system infrastructure necessary to carry out queued component interface passing with such location and synchronous/queued interaction transparency is implemented in an enhancement of the method invocation queuing facility (i.e., the "recorder" for the processing object) of the queued component architecture 330 (FIG. 5) described in more detail below.

For illustration purposes, one example of an application program per the typical use scenario 100 is an on-line order entry application 200 shown in FIG. 4. In this on-line order entry application 200, a base client program 202 submits an order to an order object 204 by invoking methods on an interface ("IOrder") 206 thereof, and receives an order number. The order object 204 stores details of the order in an order database 208, and in turn invokes methods of an interface ("IShip") 212 on a shipping object 210 to submit the order to the shipping object. The shipping object 210 processes the order request, updates its shipping database 214, and invokes methods on an interface ("INotify") 222 of a completion notification object 220. The completion notification object 220 also updates the order database 208 with the shipment status. Reference is made to this example application program from time-to-time in the following discussion for purposes of illustration.

Returning to a more detailed discussion of the use scenario 100 of FIGS. 1–3, the client program 102 begins the queued component interface passing by requesting creation of a queued component version of the processing object 110 within a client transaction 104 shown in FIG. 1. As described in the Queued Method Invocations Patent (incorporated above by reference), the client program 102 creates the queued component version of the processing object 110 through a request to the CoGetObject application programming interface (API), which uses a special queued component moniker. In its request, the client program specifies the class of the processing object and an interface 108 of the processing object 110. For the example order entry application 200 of FIG. 4, the order object 204 is the client program, while the shipping object 210 acts as the processing object 110. The order object's CoGetObject request to create the shipping object generally would be the following: "CoGetObject("queue:/new:QCShip.Ship, NULL, IID_IShip, (void**) &pShip)."

The CoGetObject API builds a processing object recorder 106 that has the requested processing object interface 108. As described more fully below, the processing object recorder 106 will act as a proxy for the processing object 110 within the local process of the client program 102. The client program can invoke methods of the processing object by issuing local procedure calls to the processing object recorder's interface 108. In response, the recorder 108 packages such method invocations into a message for transmission to a queue associated with the processing object. The CoGetObject API returns an interface pointer for the processing object interface 108 to the client program. For the example order entry application 200 in FIG. 4, the CoGetObject API builds a recorder that proxies for the shipping object 210 in the order object's local process, and returns a pointer for the IShip interface 212 provided on that recorder back to the order object.

The client program 102 next requests creation of a queued component version of the results object 120. This results object can be an object provided by the client program, or by a separate third program. The client program or third program can then perform processing work acting on the conveyed results, such as to present notifications to the user of the client program. Again, the client program 102 uses the CoGetObject API and queued component moniker for this request, and specifies the class of the results object 120 and an interface 118 of the results object. In response to this request, the CoGetObject API builds a results object recorder 116 having the requested results object interface 118, and returns an interface pointer for this interface to the client program. For the example order entry application 200 of FIG. 4, the completion notification object 220 acts as the results object 120. The order object's CoGetObject request to create this completion notification object generally would be the following: "CoGetObject("queue:/new:QCNotify.Notify, NULL, IID_INotify, (void**) &pNotify)." The CoGetObject API builds a recorder that proxies for the completion notification object 220 in the order object's local process, and returns a pointer for the INotify interface 222 provided on that recorder back to the order object.

Using the interface pointer to the interface 108 of the processing object recorder 106, the client program 102 commences to issue method invocations to cause the processing object 110 to perform processing work for the client program. Among these method invocations, the client program invokes a method of the processing object that accepts an interface pointer as one of its parameters. The client program passes the interface pointer for the interface 118 of the results object recorder 116 in this parameter to the method invocation on the processing object recorder 106. For the example order entry application 200 of FIG. 4, the method invocation may be to a "ProcessOrder( )" method on the IShip interface 212 of the shipping object 210, in which an interface pointer to the INotify interface 222 of the completion notification object 220 is passed.

The processing object recorder 106 records the method invocations made by the client program 102 to the processing object interface 108 into a message, and transmits the message over to a message queue 112 associated with the processing object 110. In recording the method invocations, the processing object recorder 106 detects that an interface pointer (i.e., the interface pointer for the results object interface 118) is being passed as a parameter of one of the method invocations, and that the interface pointer refers to a queued component's recorder (i.e., the results object recorder 116) that provides the incoming interface of the queued component. The processing object recorder detects a passed interface pointer whether the interface pointer appears directly as a parameter of the method (i.e., in a parameter defined to be an interface pointer in the method declaration), as well as an interface pointer embedded "deep" within a data structure that is passed as the direct parameter. For example, the method can have a Variant-type data structure as one of its arguments, which argument contains a SafeArray-type data structure composed of Variant-type data, where one or more of these Variants contain interface pointers. The processing object recorder will also discover these interface pointers passed deep within this example Variant data structure. The processing object recorder then encodes sufficient information into the message for the processing object's message queue to allow the results object recorder to be rebuilt later in a separate process and transaction, and on another computer (i.e., the process, transaction and computer of the process object, which typically although not necessarily differ from that of the client program). The processing object recorder accomplishes this in the illustrated embodiment by communicating with the results object recorder and requesting that the results object recorder marshal the information needed to re-instantiate the results object recorder in the processing object's process, transaction and machine. The processing object recorder incorporates this marshaled information into the message, which it later submits to the processing object's message queue.

The client program's method invocations to the processing object's interface 108 on the processing object recorder 106 are each made as synchronous local procedure calls. After recording each of these method invocations, the processing object recorder 106 returns control to the client program. After completing all its method invocations to request processing by the processing object and any other objects in the client transaction 104, the client program 102 commits the client transaction 104 (e.g., through an explicit request to the transaction manager, or through operation of the automatic transactions feature of COM+, as discussed in more detail below). Upon committing the client transaction 104, the message from the processing object recorder 106 is persisted in the message queue 112 of the processing object. Also, the processing object recorder 106 and the results object recorder 116 are destroyed.

Later (e.g., when the machine on which the processing object runs becomes available), the queue manager (described below) moves the message with the recorded method invocations exactly once from the client program's machine to that of the processing object 110. Alternatively, such as in cases where the processing object runs on the same machine as the client program, the message need not be transmitted between machines, and is placed in the processing object's message queue on the client's machine.

At a still later method invocations playback time, a queued component player (the "processing object QC player") 124 is instantiated in a processing transaction 114 to play back the method invocations out of the message in the message queue 112. The processing object QC player 124 retrieves the message from the processing object recorder 106 out of the message queue 112. Responsive to this message, the processing object QC player creates the processing object 110, decodes or unmarshals the data for the client program's recorded method invocations from the message, and commences issuing these-method invocations to the processing object 110. In unmarshaling the method invocation data with the passed interface pointer, the processing object QC player detects the marshaled reference for the results object interface 118 of the results object recorder 116. The processing object QC player unmarshals the results object interface reference, which results in creation of a results object recorder 116' within the processing transaction 114. The processing object QC player then makes this unmarshaled method invocation to the processing object interface 108 of the processing object 110, and passes an interface pointer for the results object interface 118 on the results object recorder 116' as a parameter of this method invocation. The processing object 110 can then use this interface pointer while processing the method invocation (or subsequent method invocation) to convey the results thereof to the results object 120 by invoking methods of the results object 120 via the results object recorder 116'.

For the example order entry application 200 in FIG. 4, the shipping object's QC player (not shown in FIG. 4) unmarshals the IShip::ProcessOrder( ) method invocation, which includes the marshaled reference to the INotify interface 222 on the client-side recorder for the completion notification object 220. The shipping object QC player unmarshals this reference to create a corresponding completion notification object recorder (also not shown in FIG. 4) on the processing object's machine and transaction. The shipping object QC player then invokes the IShip::ProcessOrder( ) method on the shipping object 210 and passes an interface pointer to the INotify interface 222 on the just created completion notification object recorder. In the "ProcessOrder( )" method, the shipping object 210 then conveys results of processing that method invocation in a call to a "Notify( )" method in the "INotify" interface 222 of the completion notification object 220 using the passed interface pointer for the completion notification object recorder.

The results object recorder 116' in the processing transaction 114 records the method invocation(s) by the processing object 110 to the results object interface 118 into a message for submission to a message queue 122 associated with the results object 120. When the processing transaction 114 commits, the processing work done by the processing object on behalf of the client program is persisted. The message with method invocations to the processing object 110 has been completed, and removed from the message queue 112. The new message recorded by the results object recorde 116' with the processing object's method invocations to the results object 120 is persisted and submitted to the message queue 122 of the results object.

At a later time (e.g., when the machine on which the results object is run is available to the processing object's machine), the queue manager moves the message for the results object to the machine where the results object will be run. Alternatively, in cases where the processing object and results object run on the same machine, the message need not be transmitted to another machine for submission to the results object's message queue.

At a still later method invocations playback time, a second queued component player (the "results object QC player") 128 is instantiated in a results transaction 134 to play back the method invocations out of the message in the message queue 122. The results object QC player 128 retrieves the message from the results object recorder 116' out of the message queue 122. Responsive to this message, the results object QC player 128 creates the results object 120, decodes or unmarshals the data for the processing object's method invocations) from the message, and commences issuing such method invocations) to the results object 120. These method invocations convey the results of the processing work by the processing object 110 through the parameters of the method invocations or the particular method of the results object that is invoked. For the example order entry application 200 of FIG. 4, a completion notification object player is instantiated on the computer in which the completion notification object 220 is run. This player reads the message queued by the completion notification object recorder on the shipping object's machine, and issues the shipping object's recorded INotify::Notify( ) method invocation on the INotify interface 222 of the completion notification object 220. In the Notify( ) method, the completion notification object updates the order database 208 to reflect the shipping information resulting from the processing of the client program's "IShip::ProcessOrder( )" method by the shipping object 210.

This queued component interface passing operation in the illustrated embodiment has several advantages. First, the programming of the application with the processing object 110 remains the same for use in either the queued method invocation scenario just described, or in with synchronous method invocations where a direct interface pointer to the results object is passed. The processing object application remains unaware whether the method invocation(s) from the client program are received via a queued message or as synchronous local or remote procedure calls. In the queued case, the processing object is passed an interface pointer for the results object recorder's interface by the processing QC player. Whereas, in the synchronous procedure call case, the processing object is passed a reference to a "live," currently running instance of the results object from the client program (which may be via a remoting proxy where the results object is on a separate machine from that of the processing object). Accordingly, the programmer is able to write the processing object in a same manner for use in either case, and the client program is able to invoke the same processing object synchronously as well as through queued method invocations.

Secondly, the queued component interface passing in the illustrated embodiment provides a mechanism to transparently name the message queue 122 of the results object 120. In many typical applications (e.g., client/server type applications on distributed computing systems), the server application with the processing object 110 services many client programs on various machines in the distributing computing system. Accordingly, it is desirable to convey the results of the processing work by the processing object application back to the results object instance of the appropriate client program. This leads to a problem of determining the appropriate destination queue name at which to deliver results for any particular one of the clients. In the illustrated embodiment, the client machine has a results object class installed thereon, and configured to receive queued method invocation messages on a particular named queue. With the queued component interface passing in the illustrated embodiment, the name of the particular client's results object is carried in the marshaled data for the passed interface pointer for the results object recorder's interface 118. The name of the results object's queue is then automatically made available to the results object recorder 116' when created in the processing transaction 114 from the unmarshaled data. Accordingly, this name is available for use by the created results object recorder 116' to submit the message with the queued method invocations from the server application's processing object 110 to the proper queue for playback to the appropriate client's results object. This avoids the need to configure the name of the queue for each client's results object on the server machine.

Although the above discussion of a typical use scenario illustrates the passing of a single interface pointer reference to a results recorder in a queued method invocation and subsequent marshaling of the results recorder to the processing object-side process, machine and transaction, it should be understood that in other scenarios using the invention multiple interface pointers may be passed in one or more method invocations to the processing object, resulting in multiple recorders being marshaled through the queued method invocations message to the processing object-side.

Further, the invention also may be applied in scenarios where an interface pointer to a persist-able object other than another recorder is passed in the queued method invocation, in which case such object is persisted into the queued method invocations message for marshaling to the processing object-side.

Additionally, although the typical use scenario involves transactional processing work and transacted message queues, the use of queued component interface passing of the invention also extends to use scenarios without transactions.

Further, in some use scenarios, the interface pointer for a results object can be passed in either parallel or series sets of method invocations to more than one processing object in a workflow, so that each such processing object can then convey its processing results to the results object. For example, the client program can pass the results object interface pointer in queued method invocations made in parallel to each of an A, B and C processing objects. Alternatively, the results object interface pointer can be passed in series queued method invocations from the client program to processing object A, then from the processing object A to processing object B, and then from the processing object B to processing object C, etc. Each processing object can separately convey the results of its processing work in method invocations to the results object.

In addition, references other than an interface pointer can be passed in queued method invocations of alternative implementations of the invention. For example, in object systems in which an object pointer rather than an interface pointer is used to invoke methods of the object, such object pointer can be passed in a queued method invocation in accordance with the invention.

Queued Components Architecture

Figure 5:
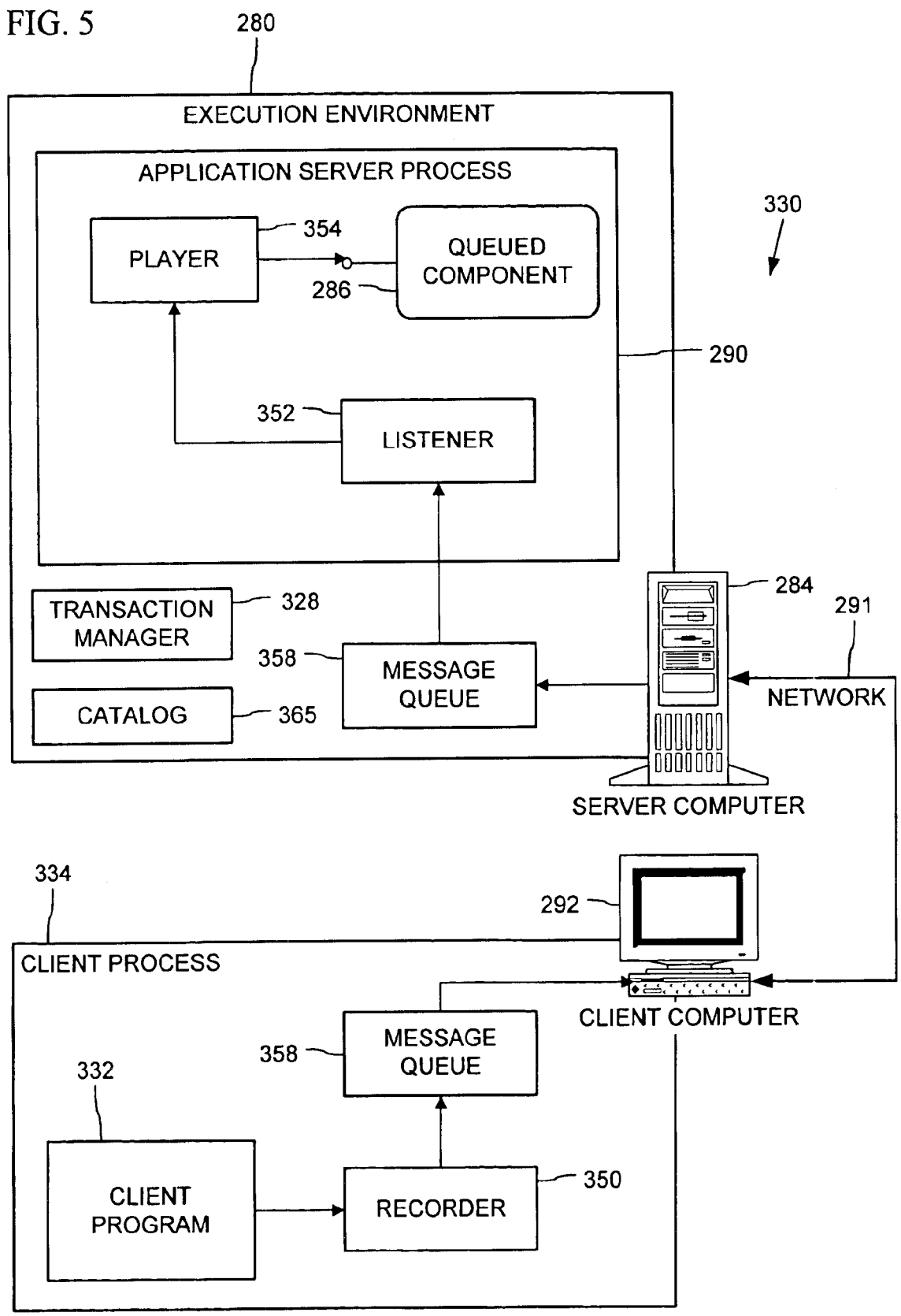
FIG. 5 is a block diagram of an execution environment and runtime architecture for results outflow of queued method invocations according to the illustrated embodiment of the invention.

With reference now to FIG. 5, the just described queued component interface passing in accordance with the illustrated embodiment of the invention is implemented as an enhancement of the queued component (QC) architecture 330 described in the prior Queued Method Invocations Patent. This queued component architecture 330 is incorporated into an object services component, entitled "COM+," of an operating system, entitled "Microsoft Windows 2000," marketed by Microsoft Corporation of Redmond, Wash. Briefly described, this software is a scaleable, high-performance network and computer operating system supporting distributed client/server computing, and providing an object execution environment for component applications conforming to the Microsoft Component Object Model (COM). The COM+ component incorporates object services from prior Microsoft object systems, including Microsoft Component Object Model (COM), Microsoft Object Linking and Embedding (OLE), Microsoft Distributed Component Object Model (DCOM), and Microsoft Transaction Server (MTS). The illustrated object services also operate in combination with a transaction processing system, including the Microsoft Distributed Transaction Coordinator (MSDTC).

Component Application Execution Environment

With reference now to FIG. 5, the above-mentioned COM+ component of the Microsoft Windows 2000 operating system provides run-time or system services to create a run-time object execution environment 280 on a server computer 284 that automatically provides queued method invocations to an object 286 (hereafter the "queued component"). The COM+ component is implemented as a dynamic link library ("DLL"). (A DLL is a well-known executable file format which allows dynamic or run-time linking of executable code into an application program's process.) The COM+ DLL is loaded directly into application server processes (e.g., "ASP" 290) that host component application objects, and runs transparently in the background of these processes.

The illustrated ASP 290 is a system process that hosts execution of component application objects, including the queued component 286. Each ASP 290 can host multiple component application objects that are grouped into a collection called a "COM+ Application" (also called a "package" in the prior Microsoft Transaction Server object execution environment). Also, multiple ASPs 290 can execute on the server computer 284 under a multi-threaded, multitasking operating system (e.g., Microsoft Windows 2000 in the illustrated embodiment). Each ASP 290 provides a separate trust boundary and fault isolation domain for the server application objects. In other words, when run in separate ASPs, a fault by one server application object which causes its ASP to terminate generally does not affect the server application objects in another ASP. In the illustrated embodiment, component application objects are grouped as a COM+ Application to be run together in one ASP 290 using an administration utility called "the COM+ Explorer." This utility provides a graphical user interface for managing attributes associated with component application objects, including grouping the objects into COM+ Applications.

In a typical installation shown in FIG. 5, the execution environment 280 is on the server computer 284 (which may be an example of the computer 820 of FIG. 9 described below) that is connected in a distributed computer network 291 comprising a large number of client computers 292 which access the component application objects in the execution environment 280. Alternatively, the execution environment 280 may reside on a single computer and host component application objects accessed by client processes also resident on that computer.

Component Application Objects Overview

With reference to FIG. 5, the computer 284 executes component applications that are developed as a COM+ Application containing a group of component application objects. For example, the component application objects (such as, the queued component 286) that are hosted in the execution environment 280 of the ASP 290 may implement the business logic of a client/server application, such as the code to manage class registrations in a university's registration application or orders in an on-line sales application. Typically, each component application comprises multiple components, each of which contains program code for a portion of the application's work.

Figure 6:
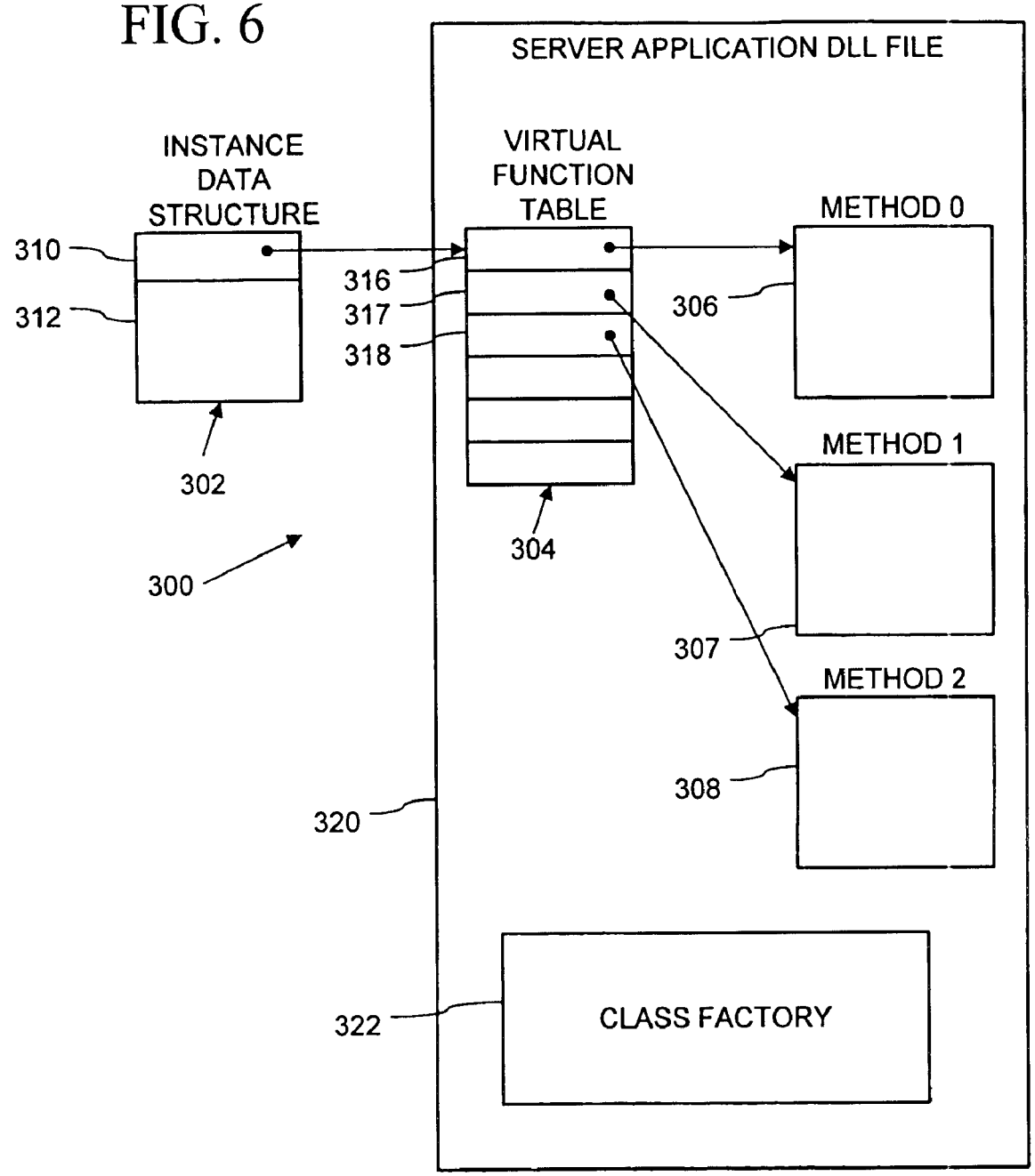
FIG. 6 is a block diagram of a structure of a queued component in the execution environment of FIG. 5.

Turning to FIG. 6, the component application objects in the illustrated execution environment 280 (FIG. 5) conform to the Microsoft Component Object Model ("COM") specification (i.e., are implemented as a "COM Object" 300) and are executed using the COM+ services of the Microsoft Windows 2000 operating system as stated above, but alternatively may be implemented according to other object standards (including the CORBA (Common Object Request Broker Architecture) specification of the Object Management Group, and Java Beans by Sun Microsystems, Inc.) and executed under object services of another operating system. The COM specification defines binary standards for objects and their interfaces which facilitate the integration of software components into applications. (For a detailed discussion of COM and OLE, see Kraig Brockschmidt, *Inside OLE, Second Edition*, Microsoft Press, Redmond, Wash. (1995)).

In accordance with COM, the COM object 300 is represented in the computer 284 (FIG. 5) by an instance data structure 302, a virtual function table 304, and methods or member functions 306–308. The instance data structure 302 contains a pointer 310 to the virtual function table 304 and data 312 (also referred to as data members, or properties of the object). A pointer is a data value that holds the address of an item in memory. The virtual function table 304 contains entries 316–318 for the methods 306–308. Each of the entries 316–318 contains a reference to the code 306–308 that implements the corresponding method.

The pointer 310, the virtual function table 304, and the methods 306–308 implement an interface of the COM object 300. By convention, the interfaces of a COM object are illustrated graphically as a plug-in jack as shown for the queued component 286 in FIG. 5. Also, interfaces conventionally are given names beginning with a capital "I." In accordance with COM, the COM object 300 can include multiple interfaces, which are implemented with one or more virtual function tables. The method of an interface is denoted as "IInterfaceName::FunctionName."

The virtual function table 304 and methods 306–308 of the COM object 300 are provided by an object server program 320 (hereafter "object server DLL") which is stored in the computer as a dynamic link library file (denoted with a ".dll" file name extension). In accordance with COM, the object server DLL 320 includes code for the virtual function table 304 and methods 306–308 of the classes that it supports, and also includes a class factory 322 that generates the instance data structure 302 for an object of the class.

Other objects and programs (referred to as a "client" of the COM object 300) access the functionality of the COM object by invoking the methods through the COM object's interfaces. First however, the COM object must be instantiated (i.e., by causing the class factory to create the instance data structure 302 of the object); and the client must obtain an interface pointer to the COM object.

Before the COM object 300 can be instantiated, the object is first installed on the computer 20. Typically, installation involves installing a group of related objects contained in a COM+ Application. The COM object 300 is installed by storing the object server DLL file(s) 320 that provides the object in data storage accessible by the computer 20 (typically the hard drive 827, shown in FIG. 9), and registering COM attributes (e.g., class identifier, path and name of the object server DLL file 320, etc.) of the COM object in a system registry, a catalog, or like configuration database.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the Microsoft Windows 2000 operating system in a file named "OLE32.DLL." Also in COM+, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateGUID" (or any of several other APIs and utilities that are used to create universally unique identifiers) and assigns to the respective classes. The interfaces of a component additionally are associated with interface identifiers ("IIDs").

In particular, the COM+ library provides API functions, e.g., "CoCreateInstance( )" and "CoGetObject( )," that the client program can call to request creation of a component using its assigned CLSID and an IID of a desired interface. In response to a client's instantiation request, the "CoCreateInstanceo( )" API looks up the registry entry of the requested CLSID in the registry to identify the executable file for the class. The "CoCreateInstance( )" API function then loads the class' executable file, and uses the class factory in the executable file to create an instance of the COM object 300. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 300 in the system registry. The "CoGetObject( )" API, on the other hand, uses the COM Moniker Architecture to parse a string that identifies the server object class, and create a moniker object that is then used to create an instance of the server object class.

Once the client of the COM object 300 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a method named "QueryInterface( )." The "QueryInterface( )" function can be called with an interface identifier as an argument, and returns a pointer to the interface associated with that interface identifier. The "IUnknown" interface of each COM object also includes methods, "AddRef( )" and "Release( )", for maintaining a count of client programs holding a reference (e.g., an interface pointer) to the COM object. By convention, the "IUnknown" interface's methods are included as part of each interface on a COM object. Thus, any interface pointer that the client obtains to an interface of the COM object 300 can be used to call the QueryInterface function.

Transaction Processing Overview

With reference again to FIG. 5, the COM+ component also implements automatic transaction processing for the component application objects in the illustrated execution environment 280. Automatic transaction processing is disclosed more fully in Helland et al., "Automatic Transaction Processing Of Component-Based Server Applications," U.S. Pat. No. 5,890,161, filed Oct. 28, 1997 (hereafter the "Automatic Transactions Patent Application"), the disclosure of which is incorporated herein by reference. Briefly, the automatic transaction processing automatically coordinates component application objects' processing activities in the execution environment 280 that form parts of an operation so as to take effect as a single indivisible unit of work, commonly referred to as a transaction.

Transactions in the execution environment 280 are managed by a transaction manager 328. The transaction manger 328 is a system service that coordinates transactions involving multiple managed transactional resources, such as databases, file systems, etc. The transaction manager 328 ensures that all processing work (e.g., database updates) involved in a transaction occurs in conformance with the ACID properties (Atomicity, Consistency, Isolation, Durability) using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 348 is the Microsoft Distributed Transaction Coordinator (MSDTC), incorporated in the Microsoft Windows 2000 operating system. For additional background information on transaction processing, see, inter alia, Jim Gray and Andreas Reuter, *Transaction Processing Concepts and Techniques*, Morgan Kaufmann, 1993.

Queued Components Overview

With reference still to FIG. 5, the COM+ component of Microsoft Windows 2000 further implements a queued component runtime architecture 330 (hereafter "QC architecture") which supports queued method invocations on a queued component 286 as described more fully in the Queued Method Invocations Patent (incorporated by reference above). A queued component is a COM object (having the structure described above and shown in FIG. 6) that is designated as supporting queued method invocations, such as by associating an attribute (the "QUEUEABLE" attribute) with the component's interfaces in an object configuration database (called the "catalog" 365 in the illustrated execution environment 280) or in the interface definition language description of the component's class. The queued component 286 also is packaged in a COM+ Application that is designated as a "Queued App" and has associated queue names in the catalog 365.

In the QC architecture 330, a client 332 in a process 334 on the client computer 292 can issue method invocations on the queued component 286 using the usual COM conventions for real-time synchronous interaction with an in-process COM object, which method invocations are recorded at a client-side of the client-to-object interaction and queued for later playback to the queued component 286. Later, after the client 332 completes use of the queued component 286 (e.g., as indicated by release of the queued component 286, or completion of a transaction in which the client 332 participates), the illustrated QC architecture 330 plays back the queued method invocations from the queue to the queued component 286, by invoking the queued component's methods through its virtual function table or a dispatch interface (for dynamic binding), as with a local method call. The programming and operation of the client 332 and the queued component 286 thus is the same as though the method invocations were synchronous, subject to the limitation that no information can be conveyed back to the client through out parameters or return values. Meanwhile, the QC architecture 330 handles all details of recording, queuing and playback of the client's method invocations to effect the asynchronous method invocation queuing.

More specifically, the COM+ component supplies various runtime object services to COM objects that run on the computer system 20. The runtime services provide a recorder 350, a listener 352 and a player 354 that effect queued method invocations via normal call semantics by the client 332 on the queued component 286. The recorder 350 proxies for the queued component to perform marshaling of the client's method invocations with their call parameters and associated data into messages, and also uses a messaging queuing API (such as, the "Microsoft Message Queue" or "MSMQ") to place the messages in a method invocations message queue 358 that is associated with the queued component 286. (For further details of MSMQ, see Microsoft Developer Network (MSDN) Library Edition— October 1999, SDK Documentation, Platform SDK, Networking and Distributed Services, Microsoft Message Queue Server (MSMQ).) The listener 352 waits for messages to arrive at the queue 358, and dispatches the messages as they arrive to the player 354. The player 354 unmarshals the method invocation from the message, and issues the method invocations to the queued component 286.

Figure 7:
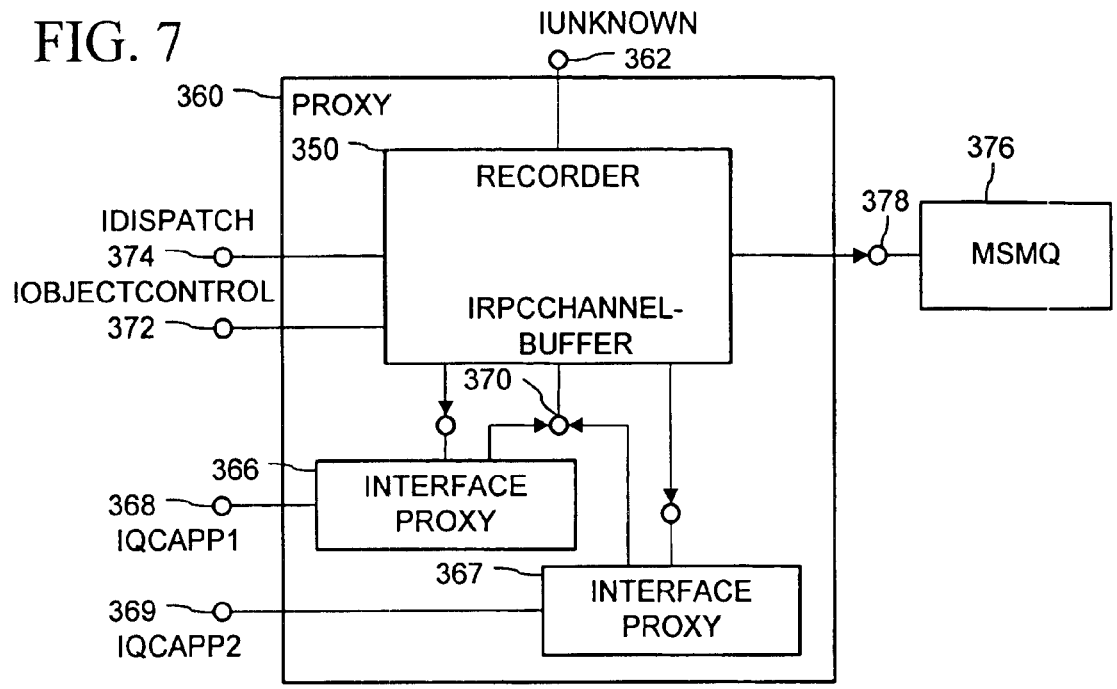
FIG. 7 is a block diagram of a recorder and proxy in the runtime architecture of FIG. 5.

With reference more particularly to FIG. 7, the recorder 350 supplied by the COM+ runtime services is a COM object that acts as a proxy manager of a proxy 360 for the queued component within the client process 334 (FIG. 5). As proxy manager, the recorder 350 manages one or more interface proxies 366 and 367. The interface proxies provide an implementation of the interfaces 287 of the queued component 286 (FIG. 5) so as to proxy for the queued component 286 in the client process 334 (FIG. 5), and receive method invocations of the client 332 on the queued component 286 as direct method calls to the proxy interfaces. The interface proxies 366–367 are generated according to the Standard Marshaling Architecture of the Microsoft COM RPC (i.e., generated from Microsoft Interface Definition Language (MIDL) descriptions of the queue component 286) or according to the Marshaler of the Microsoft Automation Type Library. (For a more detailed discussion of the Microsoft COM RPC, see Brockschmidt, *Inside OLE, Second Edition* 277–338 (Microsoft Press 1995)).

The recorder 350 also implements an "IRpcChannelBuffer" interface 370 and an "IObjectControl" interface 372. The IObjectControl interface 372 is an interface defined per the Microsoft Transaction Server (MTS) and used by the recorder 350 to receive notifications of object deactivation in accordance with the Just-In-Time Activation feature of MTS (which feature is integrated into COM+). The "IRpcChannelBuffer" interface is an interface defined in the COM RPC Standard Marshaling Architecture.

The interface proxies 366–367 are generated by the MIDL compiler to marshal the client's method invocations with appropriate call parameters and related data from the memory of the client process 334 (FIG. 5) into a buffer. As per the Standard Marshaling Architecture of the Microsoft COM RPC, the interface proxies 366–367 use the "IRpcChannelBuffer" interface 370 (which is a standard COM interface defined in the Standard Marshaling Architecture) to transfer the buffer to the ASP 290 (FIG. 5) of the queued component. However, instead of transferring the method invocation via a real-time RPC, the implementation of the "IRpcChannelBuffer" interface 370 in the recorder 350 records all of the client's method invocations on the queued component 286 (other than those to the IUnknown interface's methods) into one contiguous buffer. The recorder implements these IUnknown methods locally and therefore does not record such method invocations in the buffer.

After the client completes use of the queued component (i.e., the client releases its reference to the queued component), the recorder 350 5 passes the buffer of the method invocations to MSMQ 376. After the client's transaction completes successfully, MSMQ 376 sends the contiguous buffer containing the recorded method invocations as a message to the message queue 358 of the COM+ Application that contains the queued component 286. On the other hand, if the client's transaction aborts, the recorder discards the buffer, does not send the message, and the recorded method invocations are canceled. MSMQ 376 provides an API 378 to receive the recorder's request to send the buffered method invocations to the message queue 358 (FIG. 5).

With reference again to FIG. 5, the listener 352 is a COM+-provided COM Object created at startup of the COM+ Application to monitor the message queue 358 of the COM+ Application containing the queued component 286. Upon creation, the listener 352 opens the COM+ Application's message queue 358, and waits for messages to arrive. As messages arrive, the listener 352 dispatches a thread to execute an instance of the player 354 that consumes and processes one of the messages. In the illustrated QC architecture 330, there is a single listener 352 per ASP 290.

Also, the listener 352 creates a player object for each arriving message, which is destroyed after completing processing of its message.

The listener 352 creates and invokes the player 354 in the listener's ASP 290 when a message with method invocations for the queued component 286 arrives in the message queue 358 of the COM+ Application. The COM+ runtime services automatically start a transaction in which to create the player, as per the automatic transactions described in the above-incorporated Automatic Transactions Patent Application. The queued component 286 also may be automatically associated into this transaction, depending on the transaction attributes of the queued component 286. These transaction attributes are assigned as the component is installed into the COM+ application using a management utility called the COM+ Explorer. After creation, the player 354 calls routines in the listener 352 that use the MSMQ API to retrieve the queued message containing method invocations on the queued component 286.

Figure 8:
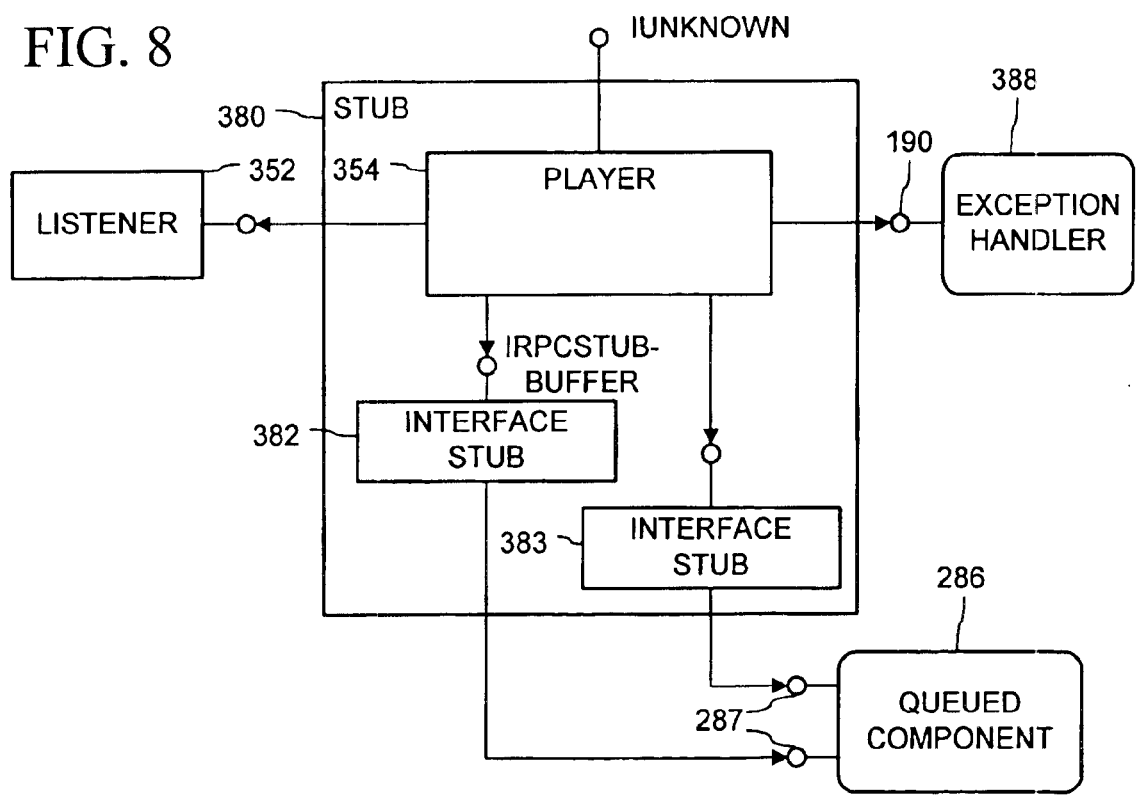
FIG. 8 is a block diagram of a player and stub in the runtime architecture of FIG. 5.

With reference now to FIG. 8, the player 354 is a COM+-provided COM Object that acts as a stub manager of a stub 380 for the queued component 286 in the ASP 290. As stub manager, the player 354 manages interface stubs 382–383 generated according to the Standard Marshaling Architecture of the Microsoft COM RPC (i.e., generated from Microsoft Interface Definition Language (MIDL) descriptions of the queued component 286) or according to the Marshaler of the Microsoft Automation Type Library.

After retrieving the method invocations for the queued component 286 from the queue 358 (FIG. 5), the player 354 instantiates the queued component 286 in the ASP 290 (FIG. 5), and loads the interface stubs 382–383 for the queued component's interfaces 287 as their respective interface identifiers (IIDs) are encountered in the message. The player 354 uses the interface stubs 382–383 to unmarshal method invocations data from the message, and issue the unmarshaled method invocations to the queued component 286. The player 354 also interprets security headers inserted by the recorder 350 by calling appropriate security services.

Enhancement To QC Architecture For Interface Passing

As remarked above, the QC architecture 330 (FIG. 5) is enhanced to also support the queued component interface passing illustrated in FIGS. 1–3 and discussed above. This architecture enhancement includes enhancing the marshaling operation of the interface proxies 366–367 associated with the recorder 350 (FIGS. 5 and 7) where a method of their provided interface 368–369 accepts an interface pointer as a parameter. In this enhanced marshaling operation, the interface proxies 366–367 detect that an interface pointer for another queued component recorder is being passed as a parameter of an invocation of such method. The enhanced marshaling operation proceeds to marshal sufficient information for recording in the method invocations message to permit instantiation of this other queued component recorder by the player 354 (FIG. 8) upon play back of the queued method invocations. Further, the player 354 is enhanced to re-instantiate the marshaled queued component recorder upon unmarshaling of the data from the message.

With reference again to FIG. 1, the client program 102 uses the CoGetObject API to create each of the processing object recorder 106 and the results object recorder 116. The CoGetObject API is a form of object activation or instantiation in COM+ that uses a moniker "display name" to create a moniker object, and then uses that moniker's BindToObject method to instantiate a component instance. A moniker is a well-known system-supplied object class in Microsoft OLE that encapsulates a display name, together with a method to bind or de-reference the display name into an instance of the named object. (For a detailed discussion of monikers, see Kraig Brockschmidt, *Inside OLE, Second Edition*, Microsoft Press, Redmond, Wash. (1995)). In alternative embodiments, other instantiation and activation mechanisms can be used to create the processing object recorder and results object recorder.

A component may be activated directly using CoGetObject and the "new" moniker. The "new" moniker accepts a Program ID or a CLSID (with or without braces) of the component to be activated. The "new" moniker binds to the Class Factory 322 (FIG. 6) of the class identified and then creates an instance of that class. Examples of the CoGetObject API calls by the client program to create the processing object recorder 106 and the results object recorder 116 are given above. The expression of these calls can vary in alternative embodiments. For example, the call to the CoGetObject API is expressed using the function name, "GetObject( )," in the Microsoft Visual Basic programming language.

The client program 102 further uses a "queue" moniker together with the CoGetObject and new moniker to activate queued components, i.e., the processing object and results object recorders. The "queue" moniker requires that it receive the CLSID of the object from the "new" moniker designated to its right in the display name (which is the first parameter to the CoGetObject API call). The "new" moniker, when left prefixed as in the examples of the client program's CoGetObject API calls given above, passes the CLSID to the moniker designated at its left in the display name. Accordingly, the display name argument of the client program's CoGetObject API call is "queue:/new:," followed by the Program ID or string-form GUID (with or without braces) of the queued component to be instantiated.

The queue moniker accepts optional parameters that alter the properties of the message sent to MSMQ, as specified in the following tables. These optional parameters can be included in the CoGetObject API call as follows: "CoGetObject(L"queue:Priority=6,ComputerName=foo/new:QCShip.Ship", NULL, IID$_{13}$ IShip, (void **) &pShip). The options are transformed in to MSMQ message properties and presented to MSMQ for validation.

TABLE 1

Queue moniker optional parameters accepted that affect the destination queue.

| Keyword | Values accepted |
| --- | --- |
| ComputerName | The computer name part of an MSMQ queue path name. Example values: "Encino," "dickd2.dns.microsoft.com," 172.30.178.153." The MSMQ queue path name is formed as ComputerName/QueueName. If not specified, the ComputerName associated with the configured application is used. |
| QueueName | The MSMQ queue name. Example: "payroll." If not specified, the queue name associated with the configured application is used. The MSMQ queue path name is formed as ComputerName/QueueName. |
| PathName | The complete MSMQ queue path name. Example value: "chicago\payroll." If not specified, the MSMQ queue path name associated with the configured application is used. |
| FormatName | The MSMQ queue "Format Name." Example: "DIRECT = 9CA3600F-7E8F-11D2-88C5-00A0C90AB40E." |

TABLE 2

Queue moniker optional parameters accepted that affect the MSMQ message.

| Keyword | Value |
| --- | --- |
| AppSpecific | An unsigned integer, e.g., "AppSpecific = 12345." |
| AuthLevel | The message authentication level. An authenticated message is digitally signed and requires a certificate for the user sending the message. |
| Delivery | The message delivery option. This value is ignored for transacted queues. |
| EncryptAlgorithm | The encryption algorithm to be used by MSMQ to encrypt and decrypt the message. |
| HashAlgorithm | A cryptographic hash function. |
| Journal | The MSMQ message journal option. |
| Label | A message label string. |
| MaxTimeToReach Queue | A maximum time, in seconds, for the message to be received by the target application. |
| Priority | A message priority level, within the MSMQ values permitted. |
| PrivLevel | Privacy level, used to encrypt messages. |
| Trace | Trace options, used in tracing MSMQ routing. |

Accordingly, in the use scenario 100 of FIGS. 1–3, each of the processing object and the results object will be packaged in a COM+ Application (or separate COM+ Applications), with the COM+ Application having the "queued" property and also the interfaces 108 and 118 being queued interfaces. The COM+ Application is installed on the distributed computing system, such that the queued properties of the COM+ Application (including the MSMQ Format Name or queue name associated therewith) and the queued properties of the interfaces are stored in the catalog. When the client program 102 requests creation of the processing object 110 and the results object 120 via the CoGetObject API (in which the client program specifies the display name string and interface for the processing object and the results object, respectively), the CoGetObject API uses the queue moniker to activate the processing and results objects as queued components. The system's moniker code parses the display name (e.g., "queue:/new:QCShip.Ship") specified in the client program's call to the CoGetObject API, and constructs a queue moniker, a new moniker, and the recorders 106 and 116 for the processing object 110 and the results object 120. As part of the display name parsing operation, the Program ID is found in the catalog, and used to look up the associated COM+ Application and the MSMQ Format Name or queue name of the queue associated with the COM+ Application. Finally, the CoGetObject API returns an interface pointer for the respective requested interface 108, 118 back to the client program 102.

When the client program 102 passes the interface pointer for the results object recorder's interface 118 as a parameter of a method invocation to the processing object recorder 106, the processing object recorder 106 uses the QueryInterface( ) method of the results object recorder interface 118 to obtain a reference to a marshaling interface of the results object recorder 116. The result returned from this method call indicates whether the results object supports marshaling. In response to the processing object recorder's marshal request, the results object recorder uses the queue moniker's persistence interface, i.e., "IPersistStream" (a well known OLE persistence interface, described inter alia in Kraig Brockschmidt, *Inside OLE, Second Edition*, Microsoft Press, Redmond, Wash. (1995)), to persist an unmarshaller CLSID, together with the queue and new monikers as a stream representation of an object capable of re-creating the results object recorder when unmarshaled in the processing transaction 114. The queue moniker includes in the persisted stream representation the name of the message queue 122 associated with the results object. This marshaling of the processing object recorder conforms to the marshal by value operation of the COM Standard Marshaling Architecture, again described, inter alia, in Kraig Brockschmidt, *Inside OLE, Second Edition*, Microsoft Press, Redmond, Wash. (1995); and in Guy Eddon, Henry Eddon, *Inside Distributed COM*, Microsoft Press (1998).

On the processing object's machine, the processing object QC player 124 causes an unmarshaling object to be created again per the standard COM Unmarshaling Architecture. This unmarshaling object creates a queue and new moniker from the marshaled results object recorder stream extracted from the method invocations message. The unmarshaling object then uses the monikers to create a new results object recorder 116' (FIG. 2) that is a copy of the original results object recorder 116 (FIG. 1).

Exemplary Operating Environment

Figure 9:
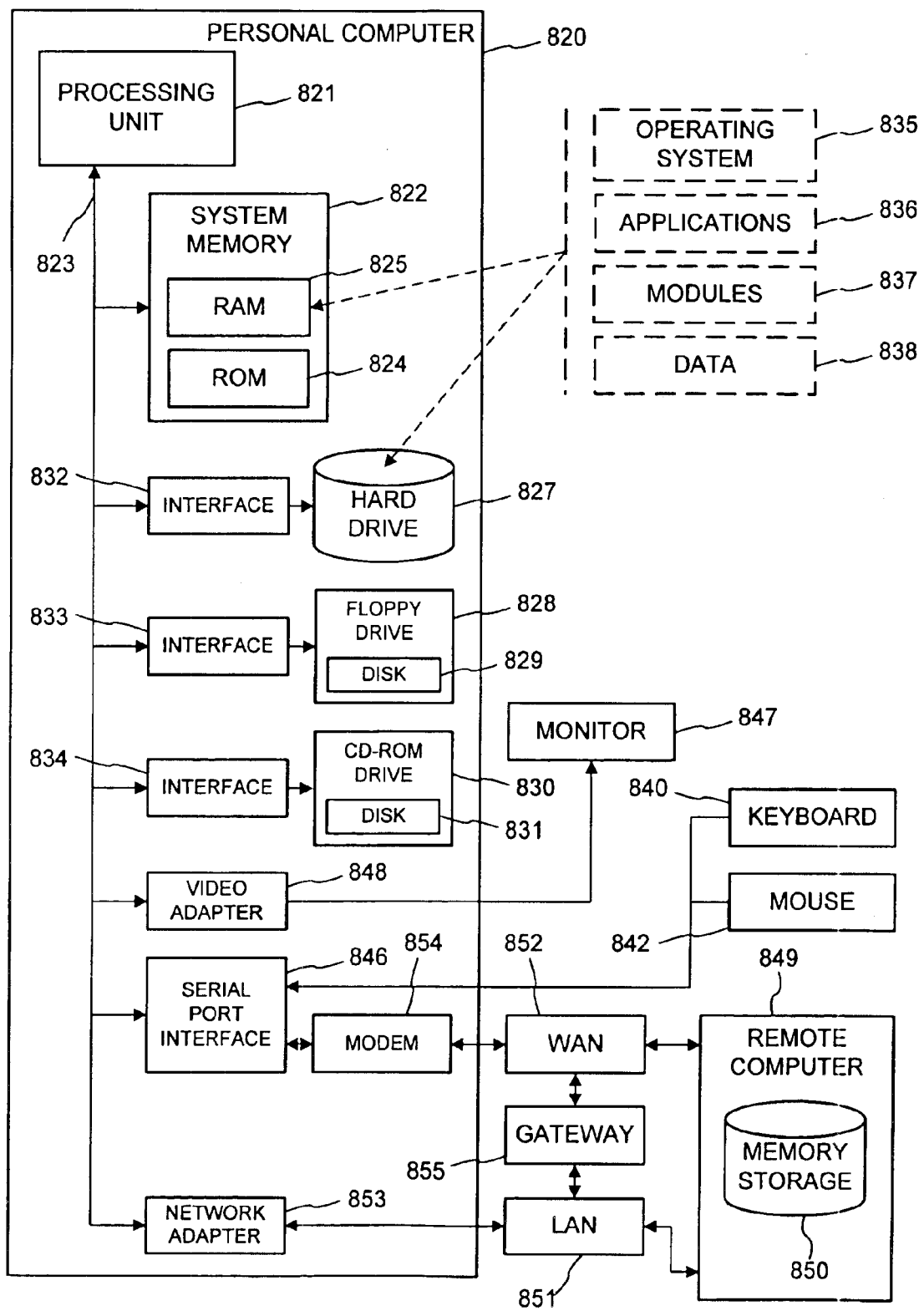
FIG. 9 is a block diagram of a computer system that may be used to implement a method and apparatus embodying the invention for results outflow of queued method invocations.

FIG. 9 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 9, an exemplary system for implementing the invention includes a conventional computer 820 (such as personal computers, laptops, palmtops, set-tops, servers, mainframes, and other variety computers), including a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838.

A user may enter commands and information into the computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 may operate in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated in FIG. 9. The logical connections depicted in FIG. 9 include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 23 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An object execution system supporting passing of an object reference in a method invocation delivered via a queued message, the system comprising:

an object configuration store containing object properties information representing properties of at least first and second object classes executable in the system, the object properties information designating the first and second objects as supporting queued method invocation, the second object class having a method with a parameter for passing an object reference;

a method invocation recording facility operative responsive to request of a client program to supply method invocations recorders for object instances of object classes designated as supporting queued method invocations;

in a first transaction, a first method invocations recorder supplied by the method invocation recording facility at request of the client program for the first object class; and in the first transaction, a second method invocations recorder supplied by the method invocation recording facility at request of the client program for the second object class, the second method invocations recorder operating in response to a method invocation in which an object reference to the first method invocations recorder is passed to cause a data stream representation of the first method invocations recorder to be marshaled into a method invocations message for submission into a message queue associated with the second object class;

a method invocation play-back facility operative responsive to a queued method invocations message to supply method invocation players for object instances of object classes designated as supporting queued method invocations;

in a second transaction, a first method invocation player supplied by the method invocation play-back facility in response to the method invocations message queued to the message queue associated with the second object class, the first method invocations player operating in response to the method invocations message to unmarshal the date stream representation and create therefrom a copy of the first method invocations recorder, and to pass an object reference to the copy of the first method invocations recorder as a parameter of a method invocation to an object of the second object class;

wherein an object reference to the copy of the first method invocation recorder is passed as a parameter of the method invocation to an object of the second object class so an object of the second object class can record results for an object of the first object class.

2. The object execution system of claim 1 wherein the first method invocations recorder is marshaled into the data stream representation via a marshal-by-value operation, such that the copy of the first method invocations recorder can be created on a separate computing machine.

3. The object execution system of claim 1 further comprising:

a persistence interface associated with the first method invocations recorder operating when invoked to persistently write the data stream representation of the first method invocations recorder; and the second method invocations recorder invoking the persistence interface to cause marshaling of the first method invocations recorder into the data stream representation.

4. The object execution system of claim 1 wherein the second method invocations recorder further operates to cause an identification of a message queue associated with the first object class to be marshaled into the data stream representation.

5. The object execution system of claim 1 further supporting execution of distributed objects across remote machines in a distributed computing system.

6. A computer-implemented transaction processing method of yielding results from processing work of a queued component to a persist-able object, where the work of the queued component is initiated by method invocations delivered via a first message queue, the method comprising:

in a first transaction,
responsive to a client program issuing a set of method invocations for the queued component, marshaling data for the method invocations of the set into a message to be enqueued into the first message queue, and when marshaling a reference for calling methods on the persist-able object in any of the method invocations issued by the client program for the queued component, persisting the persist-able object into an object-representative data stream and incorporating the object-representative data stream in the data marshaled into the message, submitting the message to the first message queue; and in a second transaction, processing the message from the first message queue, unmarshaling the data for the method invocations from the message, re-creating the persist-able object from the object-representative data stream, issuing the set of method invocations to the queued component, and passing a reference for calling methods on the re-created persist-able object in said any method invocation to the queued component.

7. The method of claim 6 wherein the persist-able object is a method invocations recorder of a second queued component.

8. The method of claim 6 wherein the references for calling methods are interface pointers referencing an interface exposed by the persist-able object.

9. In a distributed computing system having a multiplicity of client machines and a server machine, a method of conveying results of processing queued method invocations by a server-side queued component of a component-based server program on the server machine to a client-specific component-based program, the method comprising:

associating a first message queue with the server-side queued component and a second message queue with a client-specific queued component of the client-specific component-based program;

in a first transaction,
on issuing by a client program running on a first client machine in the distributed computing system a first method invocation to the server-side queued component having passed therein a reference for a client-specific queued component, recording data representative of the first method invocation into a first method invocations message, wherein said recording comprises automatically and transparently to the client program marshaling a reference to the second message queue with the data representative of the first method invocation into the first method invocations message, and submitting the first method invocations message to the first message queue;

in a second transaction, retrieving the first method invocations message from the first message queue at the server machine, unmarshaling the data representative of the first method invocation from the first method invocations message, invoking per the first method invocation a method of the server-side queued component, wherein said invoking comprises passing a reference for the client-specific queued component to the server-side queued component, and on invoking by the server-side queued component a method of the client-specific queued component using the reference passed to the server-side queued component, automatically and transparently to the server-side queued component recording data representative of the server-side queued component's method invocations using the reference passed to the server-side queued component into a second method invocations message and submitting the second method invocations message to the second message queue, whereby the server-side queued component's method invocations are queued for the client-specific queued component.

10. In a distributed computing system where a client program, a server queued component, and a client queued component are run on at least one computing machine, a method of transactional queued component interface passing to convey results of processing in the server queued component to the client queued component, the method comprising:

initiating a first transaction for encompassing processing of the client program;

on request of the client program for a reference to the server queued component, creating a first method invocation recorder in the first transaction and returning a reference for invoking methods of the first method invocation recorder to the client program;

on request of the client program for a reference to the client queued component, creating a second method invocation recorder in the first transaction and returning a reference for invoking methods of the second method invocation recorder to the client program;

on a first method invocation of the client program made using the reference for invoking methods of the first method invocation recorder and in which the reference for invoking methods of the second method invocation recorder is passed as a parameter, recording by the first method invocation recorder data of the first method invocation into a first method invocations message and marshaling the second method invocation recorder into the data of the first method invocation;

upon committal of the first transaction, submitting the first method invocations message into a first message queue associated with the server queued component;

creating the server queued component for processing any method invocations recorded in the first method invocations message in a second transaction;

retrieving the first method invocations message from the first message queue within the second transaction;

unmarshaling the second method invocation recorder from the data of the first method invocation in the retrieved first method invocation message such that the second method invocation recorder is re-created in the second transaction;

invoking a method of the server queued component in the second transaction per the first method invocation, and passing a reference for invoking methods of the re-created second method invocation recorder to the server queued component;

on a second method invocation made by the server queued component using the reference for invoking methods of the re-created second method invocation recorder, recording by the second method invocation recorder data of the second method invocation into a second method invocations message;

upon committal of the second transaction, submitting the second method invocations message into a second message queue associated with the client queued component;

creating the client queued component for processing any method invocations recorded in the second method invocations message in a third transaction; and invoking a method of the client queued component in the third transaction per the second method invocation;

whereby results of processing the first method invocation by the server queued component are conveyed to the client queued component.

11. A computer-readable medium having thereon a computer-executable method invocation queuing system program comprising:

a queued component recorder constructor operating on request of a client program to obtain a queued component reference to create a method invocation recording component and return a reference for such method invocation recording component to the client program;

in a first transaction, a first method invocation recording component created by the queued component recorder constructor responsive to a first request of a client program to obtain a first reference for a first queued component, and a second method invocation recording component created by the queued component recorder constructor responsive to a second request of the client program to obtain a second reference for a second queued component, the second queued component having a reference passing method accepting a passed object reference as a parameter thereto, the second method invocation recording component operating in response to an invocation of the reference passing method made on the second method invocation recording component having a reference for the first method invocation recording component passed as the parameter to marshal the first method invocation recording component into a data stream representative of the invocation into a message for queuing into a message queue associated with the second queued component; and in a second transaction, a queued method invocations playing component operating to retrieve the message from the message queue, the queued method invocations playing component further operating in response to the message to unmarshal the data stream, to re-create the first method invocation recording component, and to invoke the method on the second queued component with a reference for the re-created method invocation recording component passed as the parameter.

12. A computer-readable medium having thereon a computer-executable method invocation queuing system program comprising:

a queued method invocations playing component operating to retrieve a method invocations message from a message queue associated with a first queued component, the first queued component having a reference passing method accepting a passed object reference as a parameter thereto during a first transaction, the queued method invocations playing component further operating in response to a message containing a data stream representative of an invocation of the reference passing method having a reference for a method invocation recording component of a second queued component passed as the parameter to unmarshal the data stream, to re-create the method invocation recording component during a second transaction, and to invoke the method on the first queued component with a reference for the re-created method invocation recording component passed as the parameter;

wherein the reference to the re-created method invocation recording component is passed to the first queued component so the first queued component can record a result to the second queued component.

13. The computer-readable medium of claim 12 wherein the result is a method invocation intended for the second queued component.

14. The computer-readable medium of claim 12 wherein the result is a result of the method invoked on the first queued component.

* * * * *

UNITED STATES PATENT AND TRADEMARK OFFICE
CERTIFICATE OF CORRECTION

PATENT NO. : 6,920,636 B1  
APPLICATION NO. : 09/464636  
DATED : July 19, 2005  
INVENTOR(S) : Dievendorff et al.

It is certified that error appears in the above-identified patent and that said Letters Patent is hereby corrected as shown below:

On the title page, item (56), under "U.S. Patent Documents", in column 1, line 1, below "4,635,208 A 1/1987 Coleby et al." insert
-- 4,677,576   6/1987   Berlin, Jr. et al.
   4,800,488   1/1989   Agarwal et al.
   4,821,220   4/1989   Duisberg
   4,953,080   8/1990   Dysart et al.
   4,972,437   11/1990   Citron et al.
   5,093,914   3/1992   Coplien et al.
   5,119,475   06/1992   Smith et al.
   5,125,091   06/1992   Staas, Jr. et al.
   5,133,075   7/1992   Risch
   5,151,987   09/1992   Abraham et al.
   5,168,441   12/1992   Onarheim et al.
   5,210,874   5/1993   Karger --.

On the title page, item (56), under "U.S. Patent Documents", in column 1, line 2, below "5,212,793 A 5/1993 Donica et al." insert
-- 5,301,280   4/1994   Schwartz et al.
   5,307,490   4/1994   Davidson et al.
   5,315,703   5/1994   Matheny et al.
   5,442,791   8/1995   Wrabetz et al.
   5,455,953   10/1995   Russell
   5,463,625   10/1995   Yasrebi
   5,481,715   1/1996   Hamilton et al.
   5,485,617   1/1996   Stutz et al.
   5,504,898   4/1996   Klein --.

On the title page, item (56), under "U.S. Patent Documents", in column 1, line 3, below "5,511,197 A 4/1996 Hill et al." insert
-- 5,517,645   5/1996   Stutz et al.
   5,519,867   5/1996   Moeller et al. --.

Signed and Sealed this

Sixth Day of July, 2010

David J. Kappos  
*Director of the United States Patent and Trademark Office*

CERTIFICATE OF CORRECTION (continued)

U.S. Pat. No. 6,920,636 B1

On the title page, item (56), under "U.S. Patent Documents", in column 1, line 4, below "5,519,863 A 5/1996 Allen et al." insert
-- 5,560,029   9/1996   Papadopoulos et al.
   5,574,862   11/1996  Marianetti, II
   5,574,918   11/1996  Hurley et al.
   5,577,251   11/1996  Hamilton et al.
   5,577,252   11/1996  Nelson et al. --.

On the title page, item (56), under "U.S. Patent Documents", in column 1, line 6, below "5,581,760 A 12/1996 Atkinson et al." insert
-- 5,598,562   1/1997   Cutler et al.
   5,606,719   2/1997   Nichols et al.
   5,619,710   4/1997   Travis, Jr. et al.
   5,625,775   4/1997   Davis et al.
   5,652,888   7/1997   Burgess
   5,675,796   10/1997  Hodges et al. --.

On the title page, item (56), under "U.S. Patent Documents", in column 1, line 7, below "5,687,370 A 11/1997 Garst et al." insert -- 5,689,708 11/1997 Regnier et al. --.

On the title page, item (56), under "U.S. Patent Documents", in column 1, line 8, below "5,764,897 A 6/1998 Khalidi" insert
-- 5,787,281   7/1998   Schreiber et al.
5,790,789   8/1998   Suarez --.

On the title page, item (56), under "U.S. Patent Documents", in column 1, line 10, below "5,802,291 A 9/1998 Balick et al." insert -- 5,822,585 10/1998 Noble et al. --.

On the title page, item (56), under "U.S. Patent Documents", in column 1, line 11, below "5,826,270 A * 10/1998 Rutkowski et al. ...707/10" insert -- 5,838,916 11/1998 Domenikos et al. --.

On the title page, item (56), under "U.S. Patent Documents", in column 1, line 12, below "5,848,234 A * 12/1998 Chernick et al. ......709/203" insert
-- 5,857,197   1/1999   Mullins
   5,857,201   1/1999   Wright, Jr. et al.
   5,864,669   1/1999   Osterman et al.
   5,870,605   2/1999   Bracho --.

On the title page, item (56), under "U.S. Patent Documents", in column 1, line 13, below "5,872,976 A 2/1999 Yee et al." insert
-- 5,884,316   3/1999   Bernstein et al.
   5,887,171   3/1999   Tada et al.
   5,889,942   3/1999   Orenshteyn --.

On the title page, item(56), under "U.S. Patent Documents", in column 1, line 14, below "5,889,957 A 3/1999 Ratner et al." insert
-- 5,907,675   5/1999   Aahlad
   5,913,061   6/1999   Gupta et al. --.

On the title page, item (56), under "U.S. Patent Documents", in column 1, line 16, below "5,958,004 A 9/1999 Helland et al." insert -- 5,958,010 9/1999 Agarwal et al. --.

On the title page, item (56), under "Foreign Patent Documents", in column 2, line 1, below "EP 0414624 A 2/1991" insert -- EP 0623876A2   11/1994 --.

On page 2, item (56), under "U.S. Patent Documents", in column 1, line 2, below "6,026,428 A 2/2000 Hutchison et al." insert
-- 6,061,796   5/2000   Chen et al.
   6,094,688   7/2000   Mellen-Garnett et al. --.

On page 2, item (56), under "U.S. Patent Documents", in column 1, line 4, below "6,125,400 A * 9/2000 Cohen et al. ....709/330"
Insert -- 6,134,594   10/2000   Hellend et al. --.

On page 2, item (56), under "U.S. Patent Documents", in column 1, line 12, below "6,567,861 B1 * 5/2003 Kasichainula et al. ...719/330"
insert -- 6,609,128   08/2003   Underwood --.

On page 2, item (56), under "Other Publications", in column 2, line 9, after "RMI"" delete "://".

On page 2, item (56), under "Other Publications", in column 2, line 21, delete "OOPLSA" and insert -- OOPSLA --, therefor.

On page 2, item (56), under "Other Publications", in column 2, line 37, delete "Forman" and insert -- Formal --, therefor.

On page 2, item (56), under "Other Publications", in column 2, line 38, delete "ECCOP" and insert -- ECOOP --, therefor.

On page 3, item (56), under "Other Publications", in column 1, line 7, delete "Vistor" and insert -- Visitor --, therefor.

On page 3, item (56), under "Other Publications", in column 1, line 10, delete "Aspects" and insert -- Aspect --, therefor.

On page 3, item (56), under "Other Publications", in column 1, line 14, delete "Aspect" and insert -- Aspects --, therefor.

On page 3, item (56), under "Other Publications", in column 2, line 15, delete "Aspects" and insert -- Aspect --, therefor.

CERTIFICATE OF CORRECTION (continued)
U.S. Pat. No. 6,920,636 B1

On page 3, item (56), under "Other Publications", in column 2, line 20,
delete "Apsect" and insert -- Aspect --, therefor.

On page 3, item (56), under "Other Publications", in column 2, line 38,
below "Programming Workshop at ECOOP' 97, 1 pp., 1997." insert
-- "Orfali, Harkey, Edwards, "Client/Server Transaction Processing," Client/Server
Survival Guide, pages 241-288 (1994).
Brockschmidt, "Inside OLE," (second edition), chapter 5, pages 219-276 and
chapter 22, pages 1011-1063 (1995).
R. Limprecht, "Microsoft Transaction Server," IEEE, Compcon'97, pp. 14-18 (1997).
Object Transaction Services, OMG document 94.6.1, pp. 1-102, (6/1994).
Orfali et al., "RPC, Messaging, and Peer-to-Peer," Essential Client/Server Survival
Guide, Chapter 22, "Distributed Object Services:, pp. 367-372, 1994.
"Using the MSMQ API Functions - MSMQ Reference", MSDN Library - July 1998,
pages 1-87 (1998).
"Active Objects in Hybrid," Proceedings of OOPSLA 1987, by O.M. Nierstrasz,
pages 243-253, October 4-8 (1987).
Kiczales, "Going Beyond Objects for Better Separation of Concerns in Design
and Implementation," Aspect-Oriented-Programming, 1997, 1998 (86 pages).
Lopes et al., "Proceedings of the Aspect-Oriented Programming Workshop at ECOOP
'98," 1998 (including all 21 position papers, totaling 149 pages).
Lopes et al., "Proceedings of the Apect-Oriented Programming Workshop at ECOOP
'97," 1997 (including all 22 position papers, total 93 pages).
Brockschmidt, "Chapter 6 Local/Remote Transparency," Inside Ole, 2d Ed.,
pp. 277-338 (1995).
Lam, "Building Scalable Apps," PC Tech Magazine, pp. 209-210, 212-214, (April 1998).
Microsoft, Windows NT® Server, Server Operating System White Paper, "DCOM
Technical Overview," pp. 1- 43 (April 1998).
Orfali et al., "COM:OLE's Object Bus", The Essential Distributed Objects Survival
Guide, Ch. 25, pp. 429-452 (©1996).
Orfali et al., "CORBA Services: System Management and Security," The Essential
Distributed Objects Survival Guide, Ch. 10, pp. 183-202 (1996).
The Component Object Model, "Chapter 9: Connectable Objects," Footnotes, pp. 1-12,
microsoft.com/oledev/olecom/Ch09.htm. (1996)
Hackathorn R., "Publish or Perish, Solutions to overworked networks and unruly software
distribution are just part of P&S," BYTE Magazine, pp. 1-15 (9/1997).
Hamilton (Ed.), "JavaBeansTM," Sun Microsystems, Version 1.01, pp. 1-114. (7/24/1997).
Horstmann et al., "DCOM Architecture," DCOM Architecture, Microsoft Press, pp. 1-55
(July 23, 1997).
Hurwicz, "Multicast to the Masses: The IP multicast standard is ready, but the
infrastructure isn't. Yet...," BYTE Magazine, pp. 1-10 (6/1997).
Hackathorn, "When information links change constantly, Publish and Subscribe promises
robust data deliver" BYTE Magazine, pp. 1-8 (6/1997).
Loshin, "Pull out the old and push in the new with reliable and scalable P&S
middleware," BYTE Magazine, pp. 1-11 (2/1998).
Managing Performance/Reliability Trade-Offs," BYTE Magazine, Review, pp. 1-2 (2/1998).
"Monkey in the Middleware," BYTE Magazine, Reviews, pp. 1-2 (2/1998).

Montgomery, "Distributing Components: For CORBA and DCOM it's time to get practical," BYTE Magazine, Special Report, pp. 1-10 and illustrations "DCOM Architecture" and "CORBA Architecture" (4/1997).
Skeen, "Enabling the Real-Time Enterprise," BYTE Magazine, Core Technologies, pp. 1-5 and illustrations "Reliable Multicast Protocol in Action" and "Multilevel Caching Over a WAN" (1/1998).
Matena et al., "Enterprise JavaBeansTM," Version 1.0 Specification, Sun Microsystems, pp. 1-181 (March 21, 1998).
"The Component Object Model: Technical Overview," Microsoft Corporation, pp. 1-17. (1996).
Seetharaman, "The CORBA Connection," Communications of the ACM, 41:10, pp. 34-36 (October 1998).
Siegel, "OMG Overview: CORBA and the OMA in Enterprise Computing," Communications of the ACM, 41:10, pp. 37-43 (10/1998).
Vinoski, "New features for CORBA 3.0," Communications of the ACM, 41:10, pp. 44-52 (10/1998).
Schmidt, "Evaluating Architectures for Multithreaded Object Request Brokers," Communications of the ACM, 41:10, pp. 54-60 (10/1998).
Henning, "Binding, Migration, and Scalability in CORBA," Communications of the ACM, 41:10, pp. 62-71 (10/1998).
Haggerty et al., "The Benefits of CORBA-Based Network Management," Communications of the ACM, 41:10, pp. 73-79 (10/1998).
Grimes, Chapter 7: Security, DCOM Programming: A guide to creating practical applications with Microsoft's Distributed Component Object Model, pp. 319-386, 389 (1997).
Schwartz et al., "Intel's middleware move: company ponders initiatives for common object services," Info World 20:9, pp. 1-2 (March 2, 1998).
Sessions.R. COM and DCOM:Microsoft's Vision for Distributed Objects, Chapter 6, "Sharing and Scalability", pp. 249-313 (1998).
"Data Delivery When You Want It," by Dr. Richard Hackathorn, BYTE Magazine, June 1997.
"Publish and Subscribe Meets the Internet," by Pete Loshin, BYTE Magazine, February 1998.
"Event Service Specification," CORBAservices: Common Object Services Specification chapter 4, pages 1-33 (March 1995).
Data Sheet and White Paper, TIB/Rendezvous, 17 pages (1999).
Hamilton (editor), "Events," Sun Microsystems JavaBeansTM, chapter 6, pages 24-39 (1996, 1997).
King, A., "Inside WindowsTM 95," Microsoft Press, pp. 296-303 (1994).
Schroeder et al., "Performance of Firefly RPC," pp. 1-15 (April 1989).
Thacker et al., "Firefly: A Multiprocessor Workstation," SRC Research Report, pp. 1-17 (December 1987).
OMG, The Common Object Request Broker: Architecture and Specification, revision 2.0, chapter 2, pp. 1-17; chapter 4, pp. 12-16 (July 1995).
Nance, "Balance the Load with Transaction Server," BYTE Magazine, pp. 1-8 (June 1997).
McKay, "Microsoft talks up tools" InfoWorld, 20:19, 2 pp. (May 11, 1998).
Bowen, "Intel's Middleware Move," InfoWorld, Volume 20, Issue 9: 1-2, 1998.
Teegan, Network Operations and Management Symposium, IEEE, "Distributed Performance Monitoring Using SNMP V2", pp. 616-619, 1996.
Brockschmidt, "Inside OLE," (second edition), Chapter 1, "An Overview of OLE," pp. 3-60, and Part I: pp. 248-251 (1995).

"Single-threaded Apartments", microsoft.com website, pp. 1-2, May 26, 1998.
"Using Secure RPC," MSDN Library CD, pp. 1-7, April 1998.
Brown et al., "Distributed Component Object Model Protocol -- DCOM/1.0," globecom.net/ietf/draft/draft-brown-dcom-vl-spec-03.html, pp. 1-52, January 1998.
Tsai, Chii-Ren and Gligor, Virgil, "Distributed Audit with Secure Remote Procedure Calls", ©1991 IEEE, pages 154-160.
Lin, Wen-Yen and Gaudiot, Jean-Luc, "l-Structure Software Cache: A Split-Phase Transaction Runtime Cache System", ©1996 IEEE, pages 122-126.
Kaiser, J. and Mock, M., "Implementing the Real-Time Publisher/Subscriber Model on the Controller Area Network (CAN)", ©1998 IEEE, 10 pages.
Carzaniga, Antonio; Rosenblum, David S.; and Wolf, Alexander L., "Design of a Scalable Event Notification Service: Interface and Architecture", University of Colorado Department of Computer Science; August 1998, 16 pages.
Spuler, Enterprise Application Management with PATROL, 1st Edition, Prentice Hall PTR, March 4, 1999.
Gray & Reuter, The Role of a Compensating Transaction, @ Transaction Processing: Concepts and Techniques, entire book (1993).
Brockschmidt, "Inside OLE," (second edition), chapter 24, pages 1101-1144 (1995).
Byeongseob Ki, Scivis, Java for High-Performance Network Computing, Palo Alto, CA, pp. 1-10, (Feb. 1998).
Microsoft ActiveMovie 1.0 SDK Contents, Microsoft Corporation, pp. 1-11 (1996).
Byeongseob Ki, Collaborative Scientific Data Visualization, Syracuse University, Syracuse, NY, pp. 1-10.

| | | |
|---|---|---|
| 08/959,139 | 10/1997 | Helland et al. |
| 08/959,149 | 10/1997 | Limprecht et al. |
| 09/135,397 | 8/1998 | Thatte et al. |
| 09/393,011 | 9/1999 | Teegan et al. |
| 09/257,364 | 2/1999 | Hinson et al. |
| 09/135,378 | 8/1998 | Dievendorff et al. |
| 09/257,363 | 02/1999 | Hinson et al. --. |

In column 10, line 2, delete "recorde" and insert -- recorder --, therefor.

In column 10, line 22, delete "invocations)" and insert -- invocation(s) --, therefor.

In column 10, line 23, delete "invocations)" and insert -- invocation(s) --, therefor.

In column 14, line 41, delete "CoCreateInstanceo" and insert -- CoCreateInstance --, therefor.

In column 17, line 22, after "350" delete "5".

In column 19, line 16, delete "IID$_{13}$IShip" and insert -- IID_IShip --, therefor.